(12) United States Patent
Toyoda

(10) Patent No.: US 6,288,854 B1
(45) Date of Patent: *Sep. 11, 2001

(54) MOVABLE CONTROL MEMBER HAVING IMPROVED PLANAR MOVEMENT CONTROL

(75) Inventor: Yasuhiro Toyoda, Ohmiya (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/215,151

(22) Filed: Dec. 18, 1998

(30) Foreign Application Priority Data

Dec. 29, 1997 (JP) .................................... 9-367949

(51) Int. Cl.⁷ ..................................................... G02B 7/02
(52) U.S. Cl. .......................... 359/830; 359/827; 359/824
(58) Field of Search ..................... 359/830, 827, 359/824; 248/205.1

(56) References Cited

U.S. PATENT DOCUMENTS

| | | | | |
|---|---|---|---|---|
| 4,249,799 | * | 2/1981 | Inglesias | 350/257 |
| 4,737,808 | | 4/1988 | Toyoda | 354/246 |
| 4,829,329 | | 5/1989 | Toyoda et al. | 354/252 |
| 4,847,649 | | 7/1989 | Toyoda et al. | 354/252 |
| 4,963,908 | | 10/1990 | Toyoda et al. | 354/246 |
| 5,488,514 | * | 1/1996 | Bruning et al. | 359/811 |
| 5,610,678 | | 3/1997 | Tsuboi et al. | 396/337 |
| 5,969,881 | * | 10/1999 | Konno | 359/691 |

FOREIGN PATENT DOCUMENTS

| | | |
|---|---|---|
| 63-155038 | 6/1988 | (JP) . |
| 3-188430 | 8/1991 | (JP) . |
| 4-125723 | 4/1992 | (JP) . |
| 5-15121 | 1/1993 | (JP) . |
| 5-297443 | 11/1993 | (JP) . |
| 7-294975 | 11/1995 | (JP) . |
| 8-87375 | 4/1996 | (JP) . |

* cited by examiner

Primary Examiner—Georgia Epps
Assistant Examiner—Tim Thompson
(74) Attorney, Agent, or Firm—Fitzpatrick, Cella, Harper & Scinto

(57) ABSTRACT

A light flux deflecting device includes a light flux deflecting unit displacable along a predetermined plane for deflecting light flux, and a support unit for supporting the light flux deflecting unit in such a manner as to allow the light flux deflecting unit to move in a direction along the plane, but to restrain the light flux deflecting unit from moving in a direction vertical to the plane. The support unit includes a support portion comprising (1) at least three hinge portions having short sides arranged to lie in the direction along the plane, and (2) rigid members each positioned between two adjacent hinge portions and having a predetermined width in the direction along the plane. A support mechanism having a small-sized and simple construction is achieved which can support the light flux deflecting unit to be freely movable along the predetermined plane with the smallest possible resistance in driving the light flux deflecting unit for movement, and can hold the light flux deflecting unit in a proper posture or orientation without causing tilting and a play in the direction perpendicular to the predetermined plane. The light flux deflecting unit may be implemented as any movable unit displacable along the predetermined plane.

28 Claims, 27 Drawing Sheets

MOVABLE CONTROL MEMBER HAVING IMPROVED PLANAR MOVEMENT CONTROL

BACKGROUND OF THE INVENTION

1. Field of the Invention

The present invention relates to a light flux deflecting device for use in cameras and other optical equipment as an image deviation compensating device, etc. to compensate an image deviation caused by movement of the hands and so on.

2. Description of the Related Art

A device for shifting part of a lens group, which constitutes a photographing lens, in a direction perpendicular to the optical axis can be utilized in cameras, for example, as an anti-deviation optical system which predicts an image deviation by detecting an acceleration of movement of the camera that is responsible for the image deviation, and which shifts a lens in a direction perpendicular to the optical axis in accordance with a resulting prediction signal.

One example of such a lens shifting device is disclosed in Japanese Patent Laid-Open No. 3-188430. According to the disclosed device, movement of a camera is resolved into a component in a direction to move the camera horizontally (referred to as a yaw direction hereinafter) and a component in a direction to move the camera vertically (referred to as a pitch direction hereinafter). Then, the device is constructed so as to shift a deviation compensating shift lens (referred to as a compensating lens hereinafter) in both the yaw and pitch directions independently with slide motion between guide bars and bearings or between surfaces of sliding plates or the like without causing the compensating lens to move in the direction of the optical axis. The related art disclosed in Japanese Patent Laid-Open No. 3-188430 however has drawbacks in that large sliding resistance due to friction increases energy required for shifting the compensating lens by electromagnetic force, and that, strictly speaking, the compensating lens is moved in the direction of the optical axis because of minute play (tolerances) inevitably present between the guide bars and the bearings which are fitted to each other.

Also, Japanese Patent Laid-Open No. 63-155038 discloses that a compensating lens is held by a parallel 4-articulation link while it is kept from rotating about the optical axis, movement in the direction of the optical axis caused by the parallel 4-articulation link is absorbed by a guide and an urging spring to be prevented from reaching the compensating lens, and the compensating lens is pressed by the spring against a reference plane through a ball disposed therebetween. In the related art disclosed in Japanese Patent Laid-Open No. 63-155038, however, there occurs a play, though small, in a direction perpendicular to the optical axis because a lens barrel and an annular member are loosely fitted to each other. Also, during the operation, frictional resistance is generated due to friction between the loosely fitting components. This impairs such an inherent merit, which is resulted from using the hinges of the link and the ball, that resistance in driving the compensating lens for movement is small. Further, since the compensating lens is supported by a combination of the parallel4-articulation link and the ball, the mechanism is complicated and the number of parts is increased, thus resulting in a higher cost. In addition, the above publication discloses the shift mechanism only in one direction. Even if a similar shift mechanism is provided in a direction perpendicular to that direction, it is difficult to shift the compensating lens obliquely because of the specific structural nature of the parallel4-articulation link.

Further, Japanese Patent Laid-Open No. 5-297443 discloses that, in addition to means for restraining rotation of a compensating lens about the optical axis, at least three support points in the form of balls, for example, are provided between a support frame and a fixing frame for the compensating lens and are pressed by pressure applying means to reliably and accurately hold the compensating lens perpendicular to the optical axis when the lens is shifted. In the related art disclosed in Japanese Patent Laid-Open No. 5-297443, however, sliding resistance due to friction is not sufficiently small because the means for restraining rotation of the compensating lens about the optical axis utilizes sliding motion of mutually fitting members, such as a guide bar and a bearing, or a slot and a pin. Further, since the at least three balls and the pressure applying means are provided in addition to the means for restraining rotation of the compensating lens about the optical axis, the mechanism is complicated and the number of parts is increased, thus resulting in a higher cost.

Japanese Patent Laid-Open No. 7-294975 discloses that a compensating lens is moved back and forth by feed screws in the X-axis (yaw) direction and the Y-axis (pitch) direction independently, and a roller is interposed between a compensating lens frame and a movable member to avoid interference between movements of the compensating lens in the respective driving directions, thereby enabling the compensating lens to shift in all directions. Further, a ball is interposed between the compensating lens frame and a base, and the compensating lens frame is urged by a spring to be held in place to prevent the compensating lens from tilting when it is shifted. In the related art disclosed in Japanese Patent Laid-Open No. 7-294975, however, resistance produced when shifting the compensating lens is still large because a sliding frictional resistance generating portion exists between a guide shaft and a guide member for the movable member, and rolling frictional resistance is additionally generated due to the roller contact between the compensating lens frame and the movable member. With the further provision of a support mechanism using the ball, the entire mechanism is complicated and the number of parts is increased, thus resulting in a higher cost.

There have been made proposals which are applicable to support devices for optical elements, such as a shift lens, with an expectation enabling the drawbacks of the above-described conventional devices to be solved, i.e., enabling a decrease of resistance in driving the optical element to be realized with a simpler construction. As one example of those proposals, Japanese Patent Laid-Open No. 5-15121 discloses an optical pickup device for reading a signal recorded on a recording surface of an optical disc. More specifically, in a structure movably supporting an object lens used to condense a laser beam onto the recording surface of the optical disc, a joint portion supported by a pair of parallel arms is provided in spaced relation to a base, link arms crossing each other are attached to project one surface of the joint portion opposite to the other surface thereof facing the base, and a movable portion holding a lens holder is provided at tip ends of the link arms. With this structure, the object lens is supported movably in a focusing direction parallel to the optical axis and in a tracking direction perpendicular to the optical axis.

Meanwhile, a track ball has been hitherto employed in an input device, such as a pointing device, for computers. With the track ball, rotation of a spherical body is mechanically converted into separate rotations about two axes, and a resulting angle of each rotation is coded by a rotary encoder, followed by being input as coordinate information to the computer.

Also, Japanese Patent Laid-Open No. 4-125723 discloses that when an operator rolls a dome-shaped slider by the finger tip to move it, a change in magnetic field of a permanent magnet attached to the slider is detected by an electromagnetic transducer, and a cursor or pointer on a display screen is moved in accordance with an output of the electromagnetic transducer.

Further, Japanese Patent Laid-Open No. 8-87375 discloses that an operating stick is fixed to the center of a cross-shaped flexible board, and strain gauges are formed on lower surfaces of four elongated pieces of the flexible board. When an operator applies force to an upper end of the resin composite stick, the four elongated pieces are elastically deformed, causing the strain gauges to produce respective outputs. The outputs of the strain gauges are combined in such a manner as to be able to detect the direction and displacement of the applied force, and a cursor or pointer on a display screen is moved in accordance with a combined signal.

The above-described proposals however have drawbacks as follows. Since the device disclosed in Japanese Patent Laid-Open No. 5-15121 has a double structure of 4-articulation link which comprises the pair of parallel arms having four hinge portions arranged side by side in the same direction and the link arms crossing each other, a region where the movable portion is allowed to move is limited narrowly due to restrain conditions imposed by the joint portion which is interposed between the parallel arms and the link arms. Accordingly, if such a double structure is applied to a shift device for moving a lens in a plane perpendicular to the optical axis, a support device capable of realizing a desired shift region of the lens would be necessarily increased in size.

For the input device using the track ball or disclosed in Japanese Patent Laid-Open No. 4-125723, the input operation is effected upon the operator's finger tip moving on the spherical surface. For the input device disclosed in Japanese Patent Laid-Open No. 8-87375, the input operation is effected upon the stick being tilted down about the center of rotation by the operator's fingers. In each of those input devices, considering touch and feel from the viewpoint of the operator, the input operation is not matched with movement of the cursor or pointer on the display screen in the form of a plane (i.e., planar movement). Further, since the track ball is subjected to variations of torque due to mechanical losses such as friction caused in the shaft support portion and the portion for transmitting rotation to the rotary encoder, smoothness of the input operation is impaired and a good feel cannot be achieved in the input operation.

With the input device disclosed in Japanese Patent Laid-Open No. 4-125723, since the dome-shaped slider has a large contact area when it moves along a spherical surface, smoothness of the input operation is impaired due to frictional resistance and a good feel cannot be achieved in the input operation.

With the input device disclosed in Japanese Patent Laid-Open No. 8-87375, since the flexible board having the strain gauges has a limited number of elongated pieces (i.e., has the crossed form), resistance force imposed from the stick varies depending on a direction in which the stick is tilted down. Further, since the flexible board, to which the resin composite stick is fixed, is forced to deform elastically, i.e., it is subjected to unstable deformation, an operation feel is basically inferior. Accordingly, a good feeling cannot be achieved in the input operation.

SUMMARY OF THE INVENTION

In one aspect the present invention resides in a light flux deflecting device comprising a light flux deflector displacable along a predetermined plane to deflect a light flux, and support means for supporting the light flux deflector in such a manner as to allow the light flux deflector to move in a direction along the predetermined plane, but to restrain the light flux deflector from moving in a direction perpendicular to the predetermined plane, the support means including a support portion comprising (1) at least three hinge portions that extend in the direction along the predetermined plane, and (2) rigid members each positioned between two adjacent hinge portions and having a predetermined width in the direction along the predetermined plane. With this construction, a support mechanism having a small-sized and simple construction is achieved which can support the light flux deflector, which is displacable along the predetermined plane, to be freely movable along the predetermined plane with the smallest possible resistance in driving the light flux deflector for movement, and can hold the light flux deflector in a proper posture or orientation without causing tilting and a play in the direction perpendicular to the predetermined plane.

In another aspect, the present invention resides in a movable device including a movable member displacable along a predetermined plane, and support means for supporting the movable member in such a manner as to allow the movable member to move in a direction along the predetermined plane, but to restrain the movable member from moving in a direction perpendicular to the predetermined plane, the support means including a support portion comprising (1) at least three hinge portions that extend in the direction along the predetermined plane, and (2) rigid members each positioned between two adjacent hinge portions and having a predetermined width in the direction along the predetermined plane. With this construction, a support mechanism having a small-sized and simple construction is achieved which can support the movable member, which is displacable along the predetermined plane, to be freely movable along the predetermined plane with the smallest possible resistance in driving the movable member for movement, and can hold the movable member in a proper posture or orientation without causing tilting and a play in the direction perpendicular to the predetermined plane. Such movable member may be utilized in a manual operated control device, such as a curser control device for a computer.

DETAILED DESCRIPTION OF THE PREFERRED EMBODIMENTS

The present invention will be described below in detail in conjunction with illustrated embodiments.

First Embodiment

Figure 1:
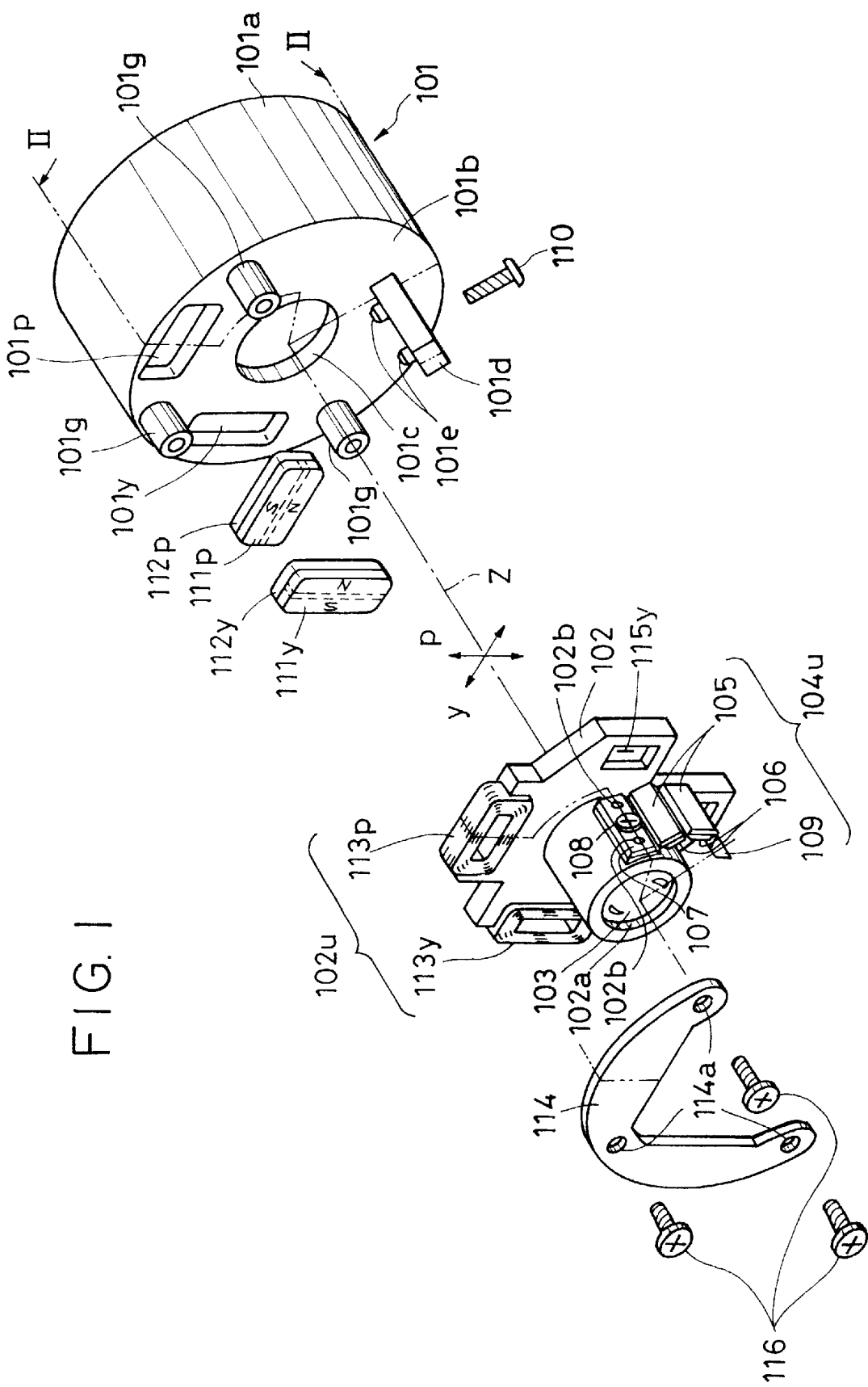
FIG. 1 is an exploded perspective view of a lens shifting device according to a first embodiment of the present invention.
Figure 2:
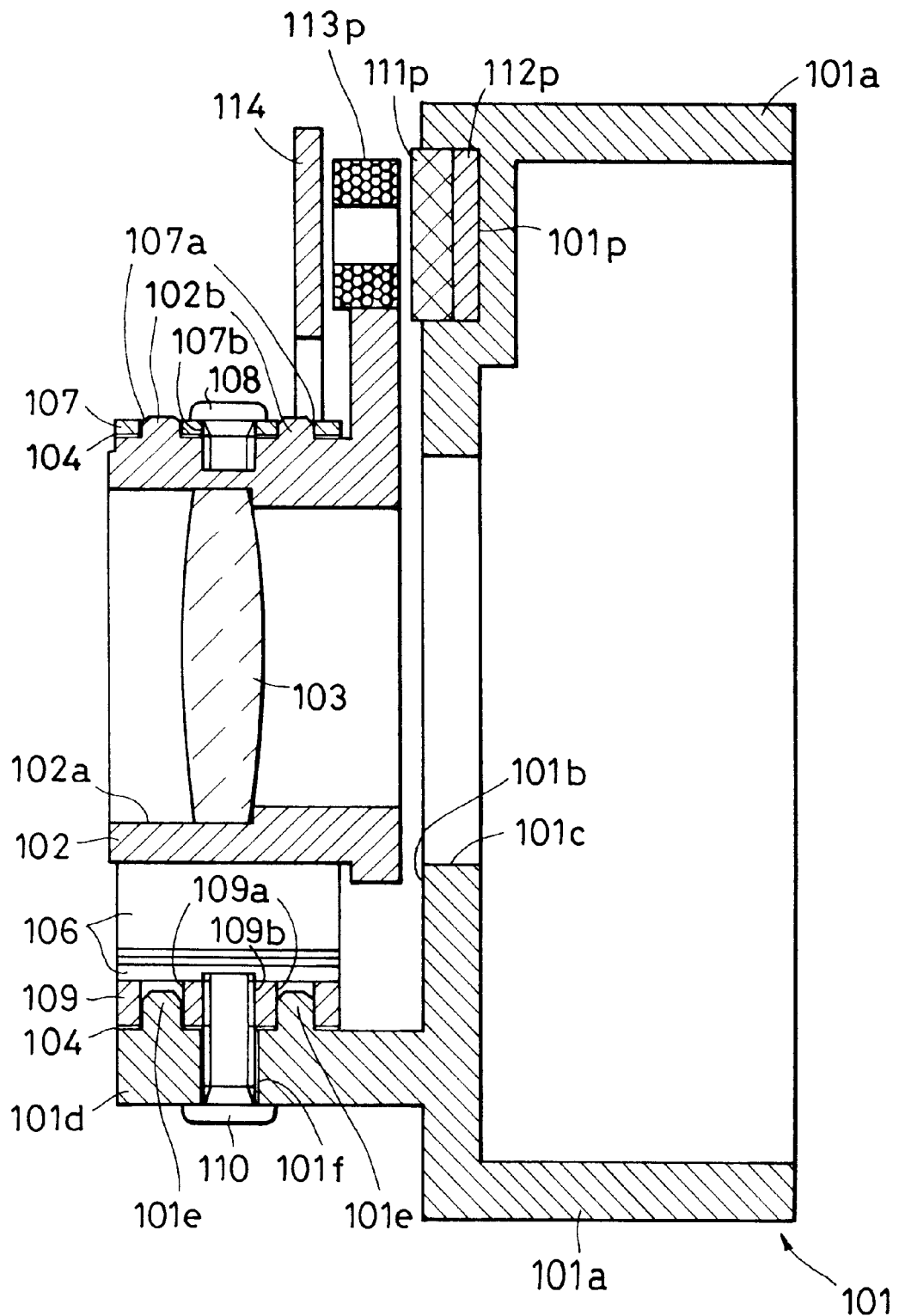
FIG. 2 is a sectional view cut along a two-dot-chain line II—II in FIG. 1.
Figure 3:
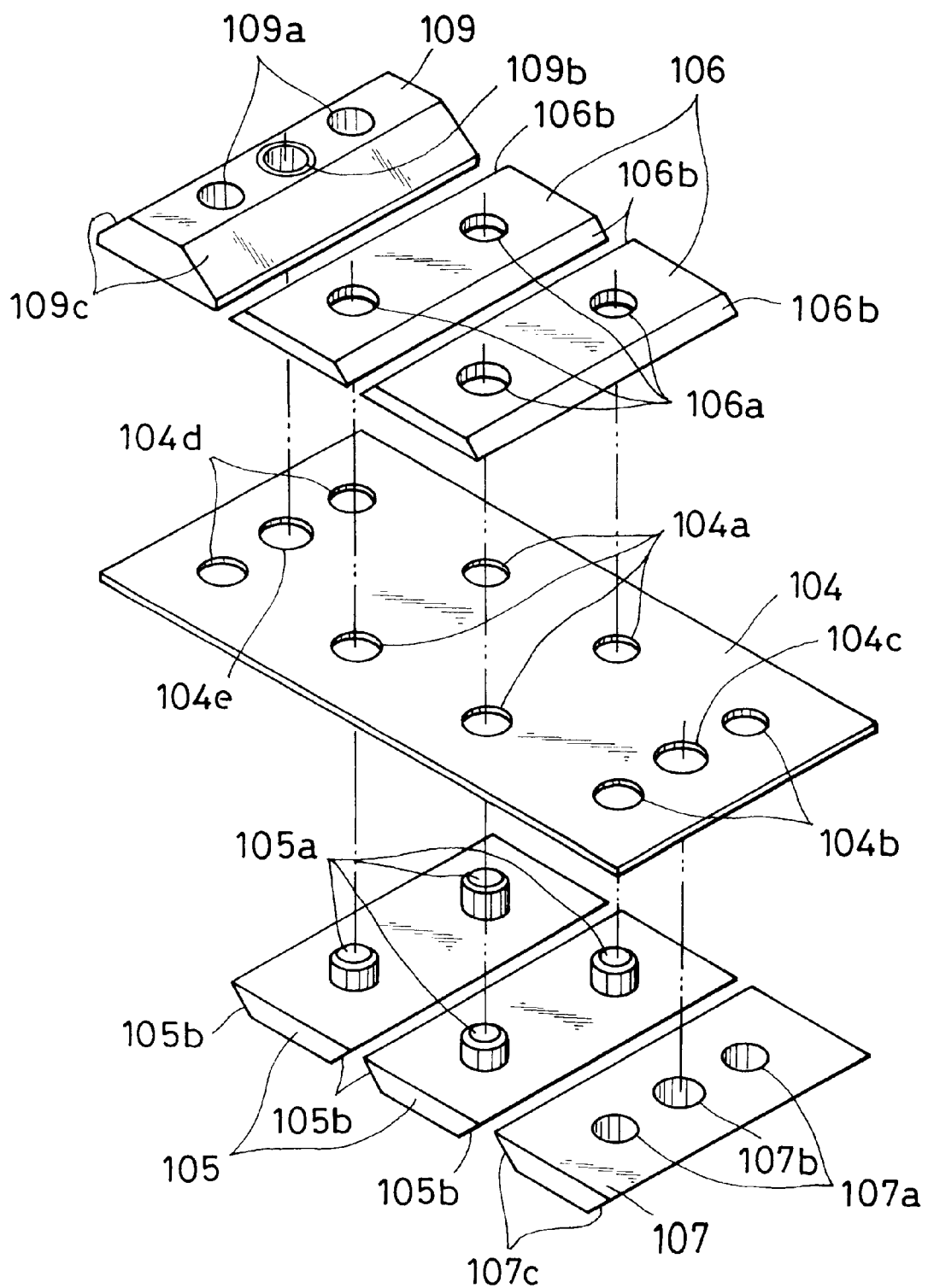
FIG. 3 is an exploded perspective view of a lens support member for supporting a movable member in FIG. 1.
Figure 4:
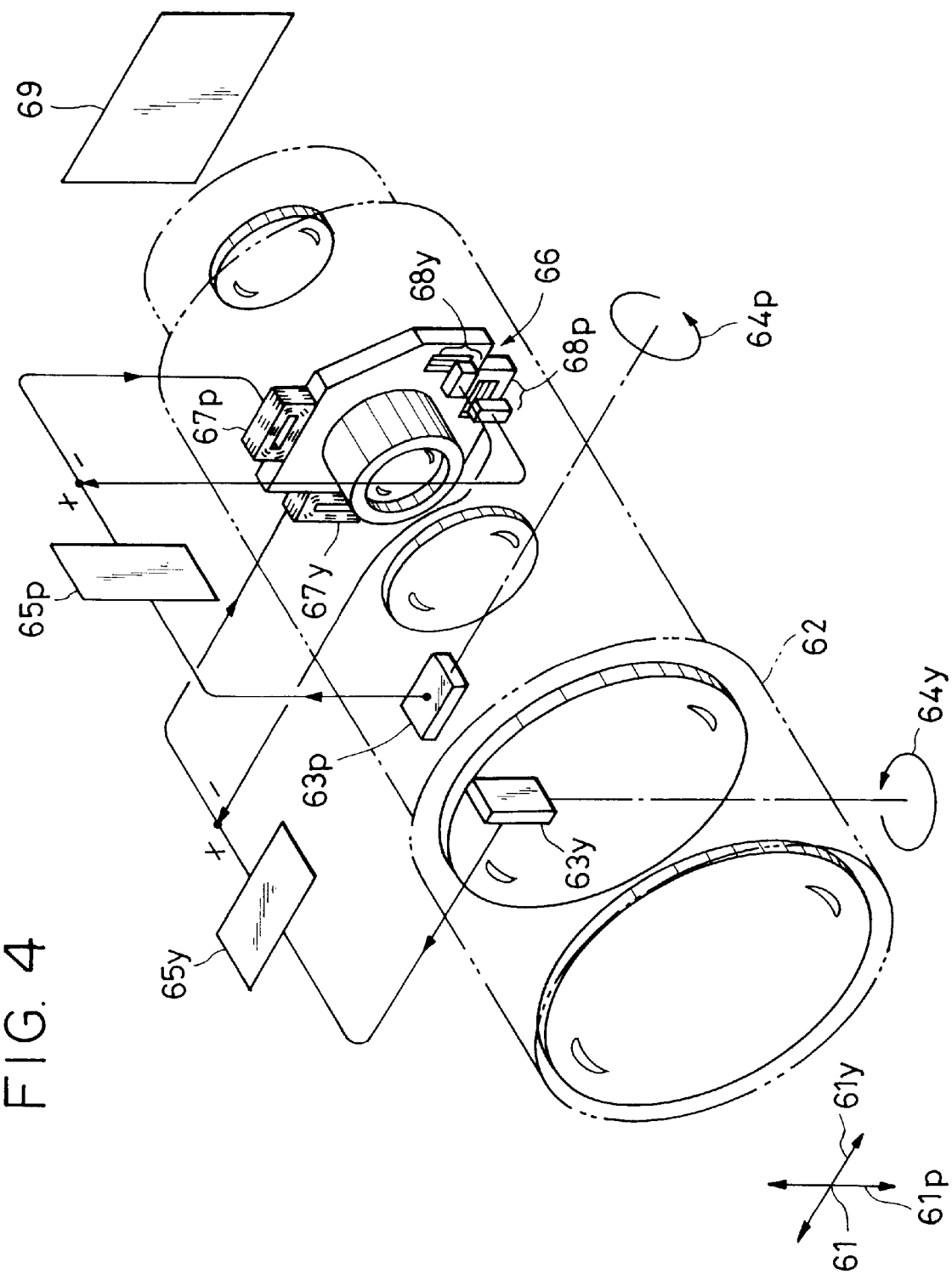
FIG. 4 is a perspective view showing a schematic construction of a general anti-deviation system.

FIG. 1 is an exploded perspective view of a lens shifting device according to a first embodiment of the present invention, FIG. 2 is a sectional view cut along a two-dot-chain line II—II in FIG. 1, FIG. 3 is an exploded perspective view of a lens support member for supporting a movable member (which holds a compensating lens) in FIG. 1, FIG. 4 is a perspective view showing a schematic construction of a general anti-deviation system, and FIGS. 5 to 8 are front views showing motion (or different states) of the lens shifting device according to the first embodiment of the present invention, as viewed from the side of an object to be photographed.

First, an image deviation restraining system (anti-deviation system) using an angular displacement detector as a vibration sensor will be briefly described with reference to FIG. 4.

An example of FIG. 4 shows a system for restraining an image deviation attributable to movement of a camera in directions of arrows 61, i.e., perpendicular movement 61p and horizontal movement 61y.

In FIG. 4, denoted by 62 is a lens barrel including a photographing optical system, and 63p, 63y are angular displacement detectors for detecting respectively an angular displacement due to perpendicular movement of the camera and an angular displacement due to horizontal movement of the camera. Directions in which the angular displacements are detected by the detectors 63p, 63y are denoted by 64p, 64y, respectively. Denoted by 65p, 65y are calculation circuits where signals from the angular displacement detectors 63p, 63y are subjected to arithmetic operation for conversion into target signals for driving a compensating lens shift mechanism 66. The compensating lens shift mechanism 66 (67p, 67y denote drivers thereof and 68p, 68y denote shift position sensors for a compensating lens) is driven in accordance with the driving target signals so that an image maintains stability on an image plane 69.

Turning now to a compensating lens shift mechanism shown in FIGS. 1 to 3, denoted by 101 is a stationary member made of a non-magnetic engineering plastic material and supported with its cylindrical outer peripheral surface 101a fitted to a lens barrel (not shown) in such a manner as being able to move only in the direction of an optical axis Z. Denoted by 101b is a front end surface of the stationary member 101 with an opening 101c formed at the center thereof for allowing a photographing light flux to pass through it. Denoted by 101d is a post integrally provided on the stationary member 101 and supporting a movable member unit 102u (described later). Denoted by 101e is a positioning projection provided on the post 101d for determining a position where a lens support member 104u is fixed. Denoted by 101f (FIG. 2) is a through hole formed in the post 101d to receive a screw 110. Denoted by 102 is a movable member made of a non-magnetic engineering plastic material and having an opening 102a formed at the center thereof to support a compensating lens 103 therein.

As shown in FIG. 3 in an enlarged scale, denoted by 104 is a very thin flexible sheet made of a synthetic resin material. Denoted by 105, 106 are each a rectangular rigid plate made of a non-magnetic, light and highly-rigid aluminum alloy material and being elongated in the direction of the optical axis Z. Positioning projections 105a are provided on the rigid plates 105, and positioning holes 106a are formed in the rigid plates 106 corresponding to the projections 105a. The lens support member 104u is constructed holding the flexible sheet 104 between the rigid plates 105 and 106 in closely sandwiched relation with the projections 105 penetrating the positioning holes 104*a*, 106*a*, and then fixing the flexible sheet 104 and the rigid plates 105, 106 together with, e.g., an adhesive applied between them. In such event, an appropriate gap is left between the adjacent rigid plates and edges of the rigid plates 105, 106 are chamfered to provide tapered portions 105*b*, 106*b* so that the adjacent rigid plates are allowed to angularly move relative to each other and the flexible sheet 104 is allowed to flex in a necessary and sufficient amount. Denoted by 107 is an attachment plate for attaching the lens support member 104*u* to the movable member 102. The attachment plate 107 has positioning holes 107*a* formed therein for fitting to positioning projections 102*b* provided on the movable member 102, and a screw penetrating hole 107*b* formed at the center thereof. The flexible sheet 104 has positioning holes 104*b* and a screw penetrating hole 104*c* formed therein corresponding to the holes 107*a*, 107*b*. The lens support member 104*u* is fixed at one end portion to the movable member 102 by fastening a screw 108 with the flexible sheet 104 held between both the members. Denoted by 109 is a support plate for attaching the lens support member 104*u* to the post 101*d*. The support plate 109 has positioning holes 109*a* formed therein for fitting to positioning projections 101*e* provided on the post 101*d*, and a screw receiving hole 109*b* formed at the center thereof. The flexible sheet 104 has positioning holes 104*d* and a screw penetrating hole 104*e* formed therein corresponding to the holes 107*a*, 107*b*. The lens support member 104*u* is fixed at the other end portion to the post 101*d* by fastening a screw 110 with the flexible sheet 104 held between them. As with the rigid plates 105, 106 mentioned above, an appropriate gap is left between the attachment plate 107 and the rigid plate 105 adjacent to each other and the support plate 109 and the rigid plate 106 adjacent to each other, and edges of the attachment plate 107 and the support plate 109 are chamfered to provide tapered portions 107*c*, 109*c* so that the adjacent plates are allowed to angularly move relative to each other and the flexible sheet 104 is allowed to flex in a necessary and sufficient amount.

Thus, the lens support member 104*u* is constructed in the form of a 3-articulation link having hinge portions 104*h* (see FIG. 5) which are elongated in the direction of the optical axis Z, and supports the movable member unit 102*u* such that the movable member unit 102*u* is freely movable in a plane perpendicular to the direction of the optical axis Z while it is restrained from displacing in the direction of the optical axis Z. Further, the lens support member 104*u* is given with an original shape so curved as to hold the compensating lens 103 in a neutral position where the lens 103 is not shifted with respect to the optical axis Z.

Denoted by 111*p* is a pitch magnet and 112*p* is a pitch yoke, these pitch magnet and yoke being both fixed in an upper central recess 101*p* of the stationary member 101. Denoted by 113*p* is a pitch coil fixed at the center of an upper end of the movable member 102. Denoted by 111*y* is a yaw magnet and 112*y* is a yaw yoke, these yaw magnet and yoke being both fixed in a lateral central recess 110*y* of the stationary member 101. Denoted by 113*y* is a yaw coil fixed at the center of a lateral end of the movable member 102. Denoted by 114 is a front yoke formed as one-piece part in common to the pitch and yaw coils.

Slight air gaps are defined between the magnets 111*p*, 111*y* and the yoke 114, and the coils 113*p*, 113*y* are positioned in respective magnetic circuits formed by the magnets and the yokes. When a current is supplied to the coil 113*p*, the movable member 102 is driven to move in the pitch direction, and when a current is supplied to the coil 113*y*, the movable member 102 is driven to move in the yaw direction.

The above-mentioned magnets, yokes (including the front yoke) and coils cooperatively constitute an electromagnetic driving member.

Further, a pitch slit 115*p* (see FIG. 5) and a yaw slit 115*y* are formed in the movable member 102, and a not-shown light emitting device (infrared light emitting diode (IRED)) and a not-shown light receiving device (semiconductor position detector (PSD)) are provided in correspondence with each of the pitch slit 115*p* and the yaw slit 115*y*. With such an arrangement, the position of the movable member 102 is detected in both the pitch and yaw directions. Incidentally, the movable member 102 including the compensating lens 103 and position detecting parts such as the coils 113*p*, 113*y*, the light emitting devices (not shown) and the slits 115*p*, 115*y*, which are assembled on it, serve as the movable member unit 102*u*.

The front yoke 114 is fixed by three screws 116 (made of non-magnetic stainless steel (SUS) material or brass material) to three bosses 101*g* which are provided on the stationary member 101 and have holes formed therein for receiving the screws, the screws 116 penetrating respective attachment holes 114*a* formed in the front yoke 114.

As described above, the movable member unit 102*u* is movable in the pitch direction p and the yaw direction y independently, and can be freely moved to any desired resultant position defined in terms of both the pitch and yaw directions within a predetermined allowable shift range.

Figure 5:
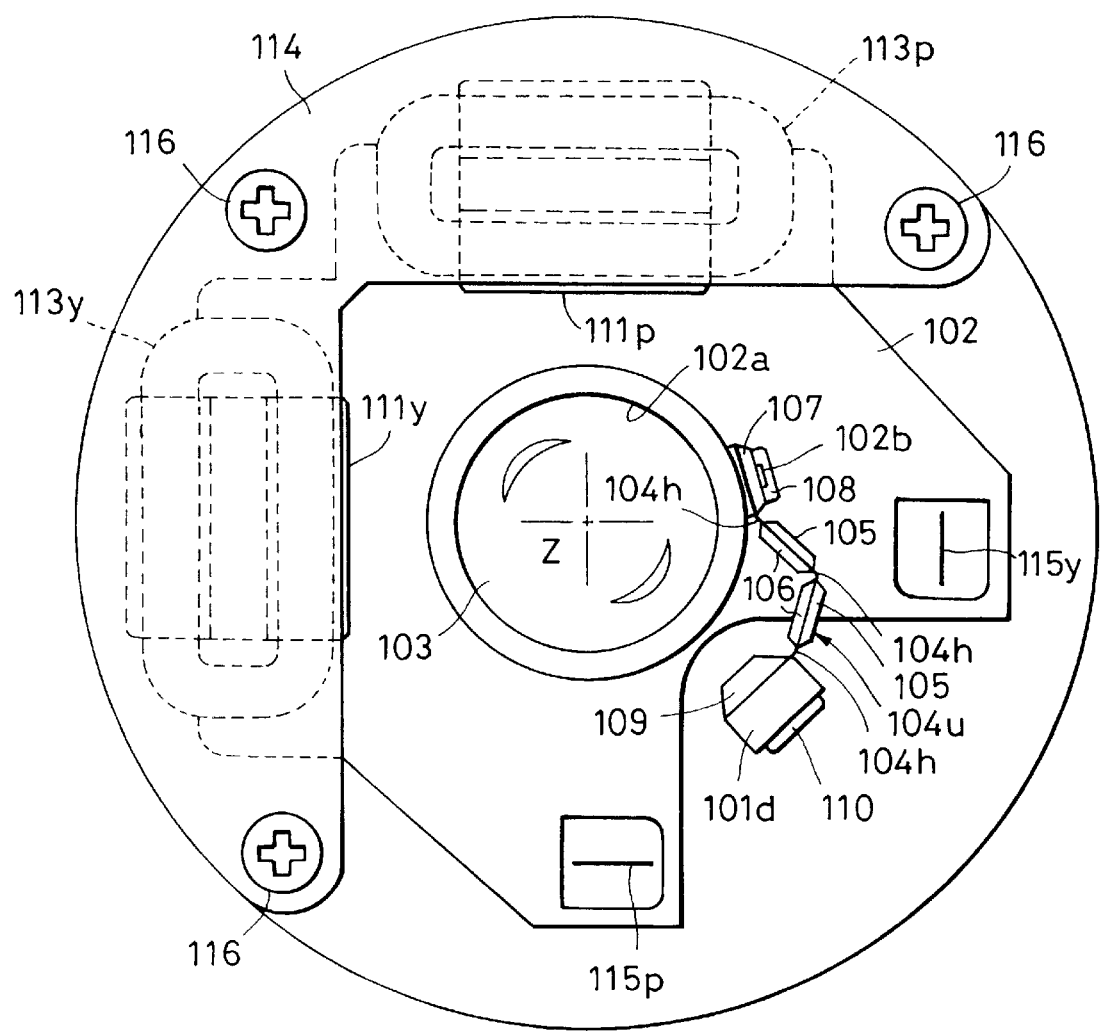
FIG. 5 is a front view showing an initial state of the lens shifting device according to the first embodiment of the present invention, as viewed from the side of an object to be photographed.
Figure 6:
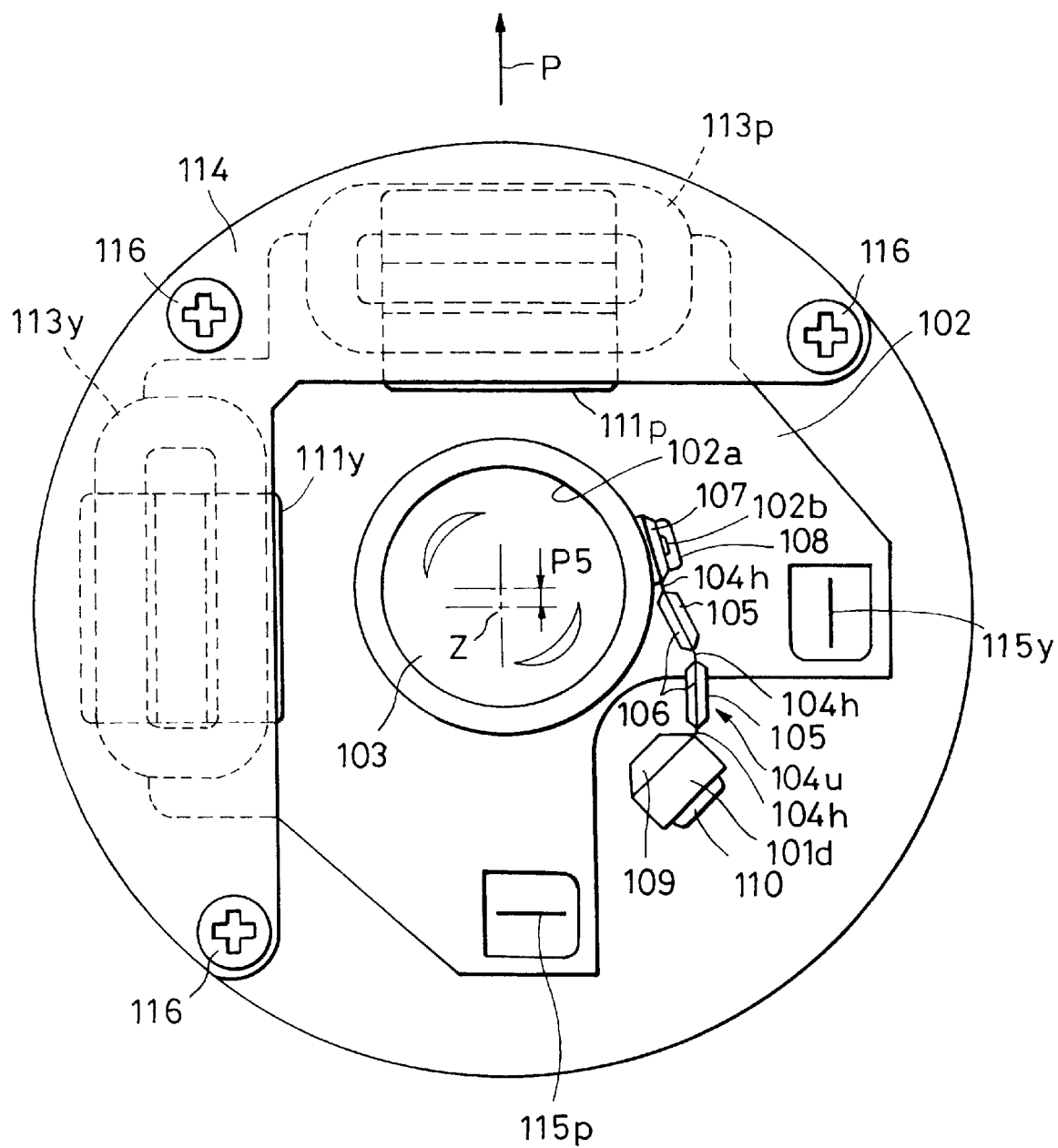
FIG. 6 is a front view showing a state where the movable member is moved in a pitch direction from the state of FIG. 5, as viewed from the side of an object to be photographed.

In the above-described construction, when the driving target signal representing a component in the pitch direction is applied to the pitch coil 113*p* (for energization thereof) under a normal state where the compensating lens 103 is held in the neutral position not shifted with respect to the optical axis Z as shown in FIG. 5, an electromagnetic force acting in the pitch direction is produced. Accordingly, as shown in FIG. 6, the movable member unit 102*u* causes the lens support member 104*u* to deform against slight resistance specific to the lens support member 104*u* and shift by a predetermined amount P5 in the pitch direction (indicated by arrow P in FIG. 6).

Figure 7:
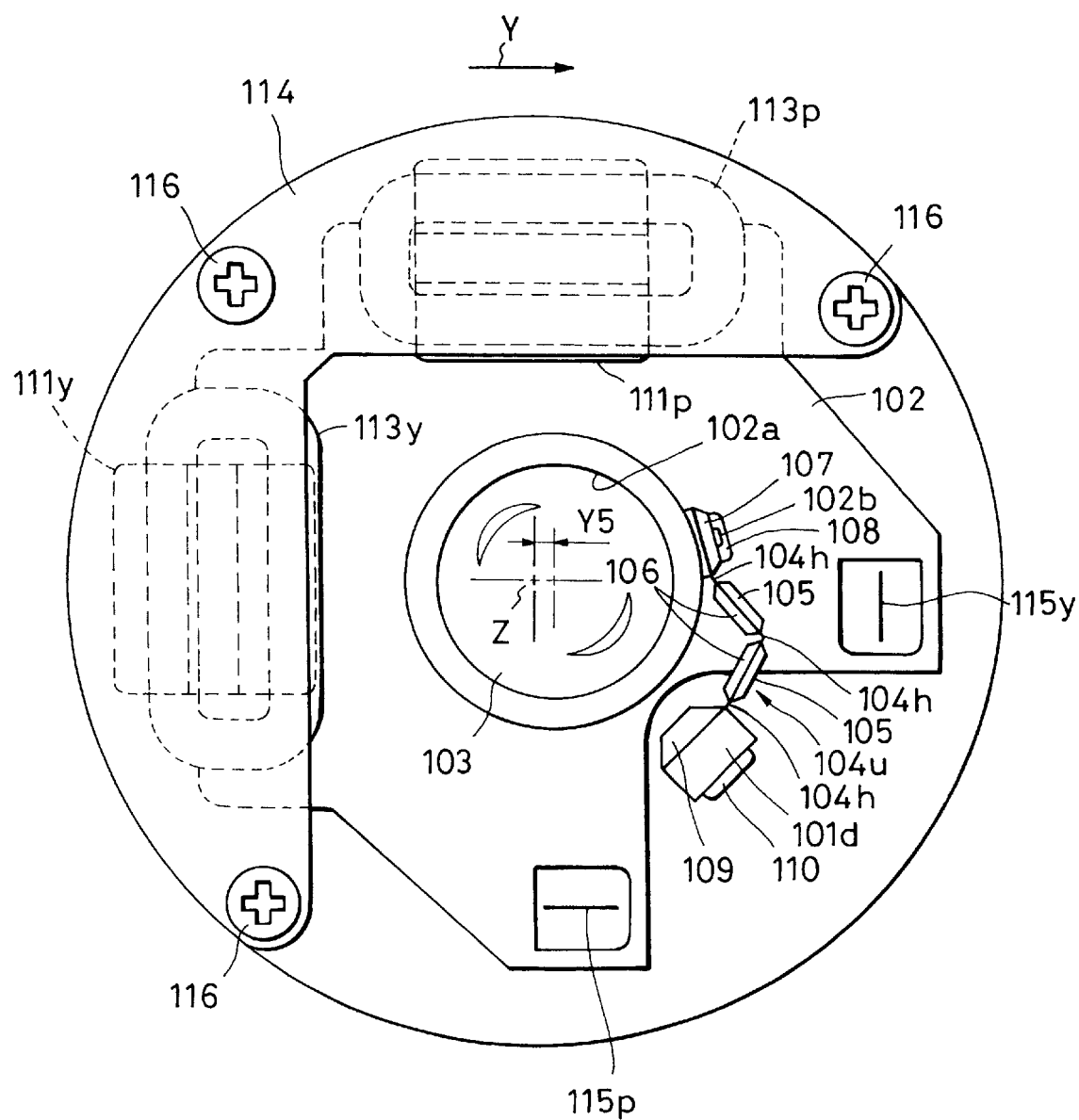
FIG. 7 is a front view showing a state where the movable member is moved in a yaw direction from the state of FIG. 5, as viewed from the side of an object to be photographed.

Also, when the driving target signal representing a component in the yaw direction is applied to the yaw coil 113*y* under the neutral state of FIG. 5, an electromagnetic force acting in the yaw direction is produced. Accordingly, as shown in FIG. 7, the movable member unit 102*u* causes the lens support member 104*u* to deform against slight resistance specific to the lens support member 104*u* and shift by a predetermined amount Y5 in the yaw direction (indicated by arrow Y in FIG. 7).

Figure 8:
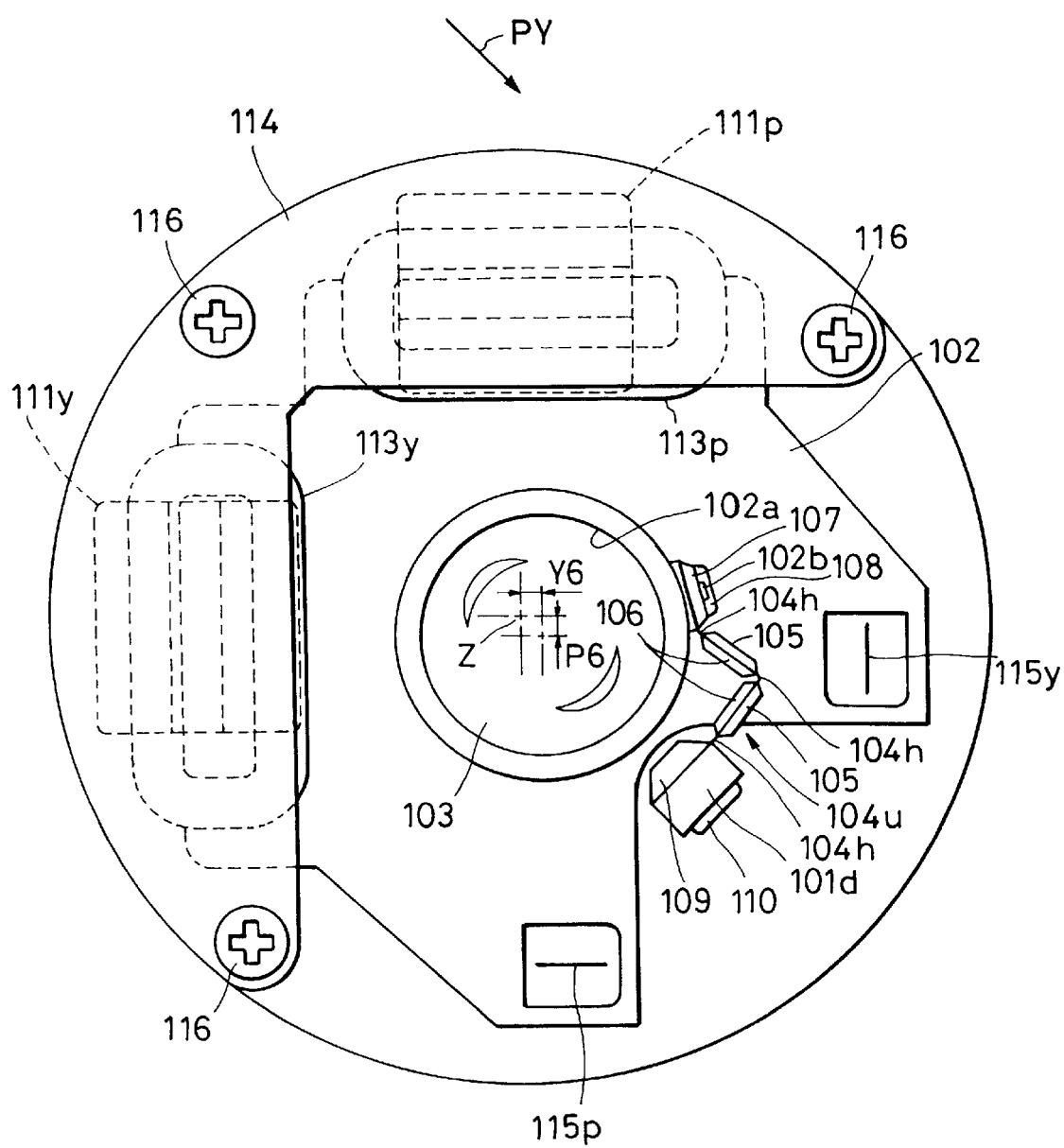
FIG. 8 is a front view showing a state where the movable member is moved to a resultant position defined in terms of both the pitch and yaw directions from the state of FIG. 5, as viewed from the side of an object to be photographed.

Further, when the driving target signals representing a resultant position defined in terms of both the pitch and yaw directions are applied to the pitch coil 113*p* and the yaw coil 113*y* under the neutral state of FIG. 5, electromagnetic forces acting in a direction toward the resultant position are produced. Accordingly, as shown in FIG. 8, the movable member unit 102*u* causes the lens support member 104*u* to deform against slight resistance specific to the lens support member 104*u* and shifts to the resultant position, i.e., by a predetermined amount P6 in the pitch direction and a predetermined amount Y6 in the yaw direction, (indicated by arrow PY in FIG. 8).

With the cooperation of the not-shown light emitting device and the not-shown light receiving device disposed respectively in correspondence with the pitch slit 115*p* and the yaw slit 115*y*, the position of the movable member unit 102*u* is detected in both the pitch and yaw directions to form a closed loop for feeding back, to the driving target signals, information as to whether the movable member unit 102*u* is shifted to the target position.

As described above, since the movable member unit 102*u* is supported by the lens support member 104*u*, which is attached to the post 101*d* on the stationary member 101 and is in the form of a3-articulation link with the hinge portions 104*h* being elongate in the direction of the optical axis, in such a condition that the movable member unit 102*u* is held parallel to the direction of the optical axis without including any play in the direction of the optical axis, the movable member unit 102*u* is allowed to freely shift in the plane perpendicular to the optical axis. In the light flux deflecting device of the present invention, therefore, optical performance of the device is hardly deteriorated due to, e.g., tilting of the movable member with respect to the optical axis and a play involved in the shift mechanism. Further, since a very thin flexible sheet providing much smaller resistance than frictional resistance caused by slide motion between a shaft and a bearing is used as a hinge, the shift driving force required for electromagnetically driving the movable member unit 102*u* can be reduced. In addition, since the lens support member 104*u* in the form of a3-articulation link enables the movable member unit 102*u* to be moved with greater flexibility within a larger region in spite of a relatively small size, the use of the lens support member 4*u* is suitable for reducing the device size.

Second Embodiment

Figure 9:
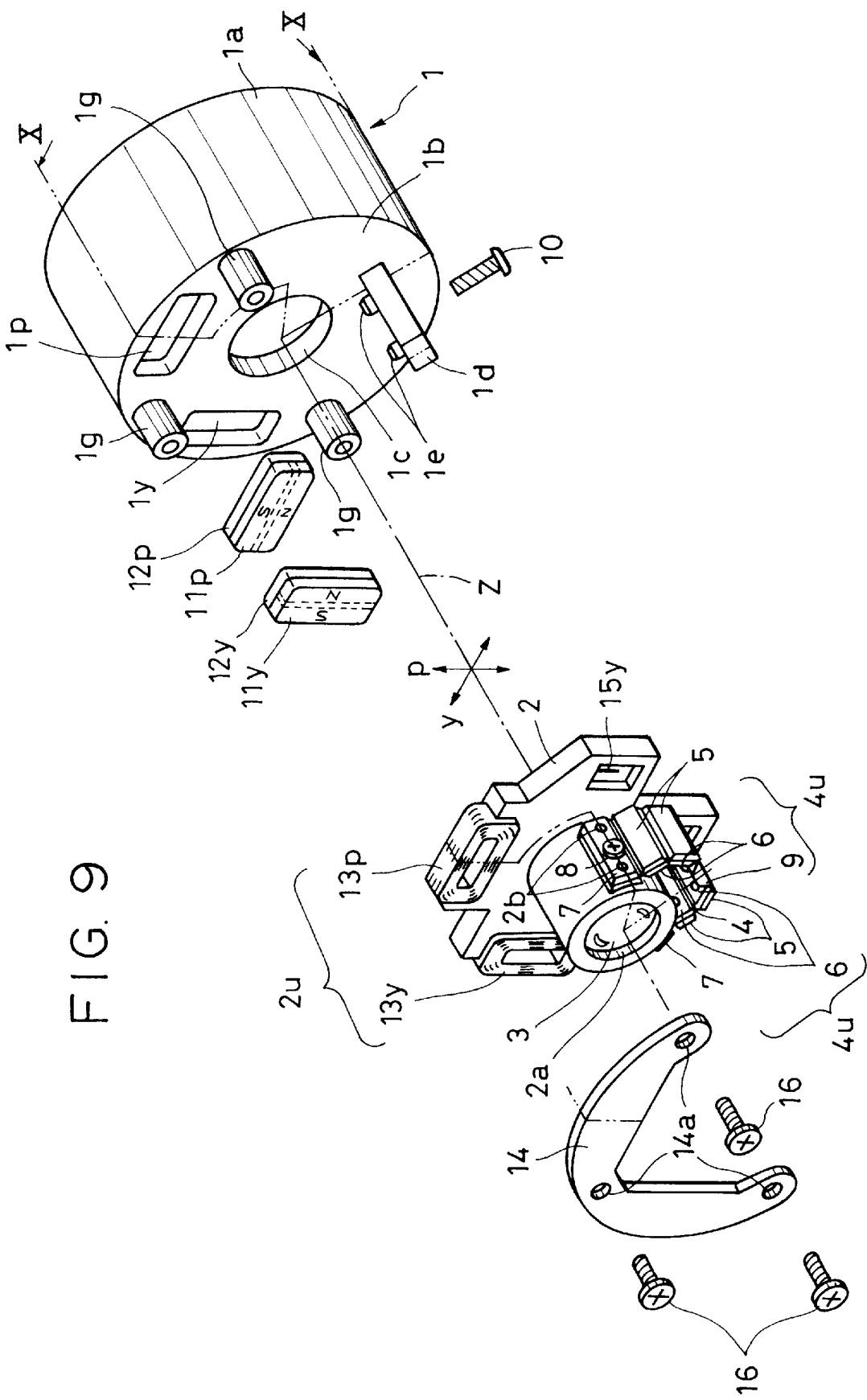
FIG. 9 is an exploded perspective view of a lens shifting device according to a second embodiment of the present invention.
Figure 10:
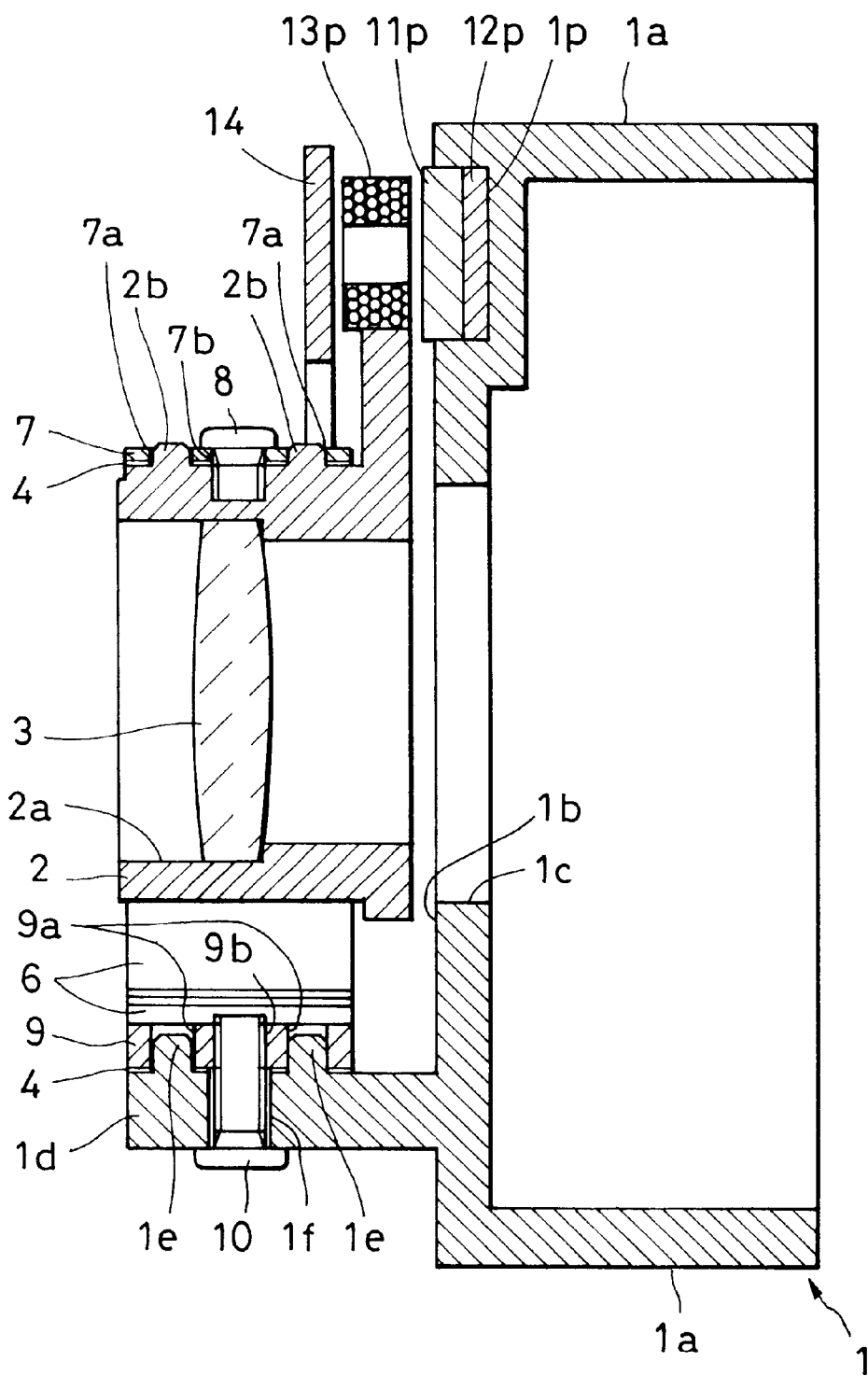
FIG. 10 is a sectional view cut along a two-dot-chain line X—X in FIG. 9.
Figure 11:
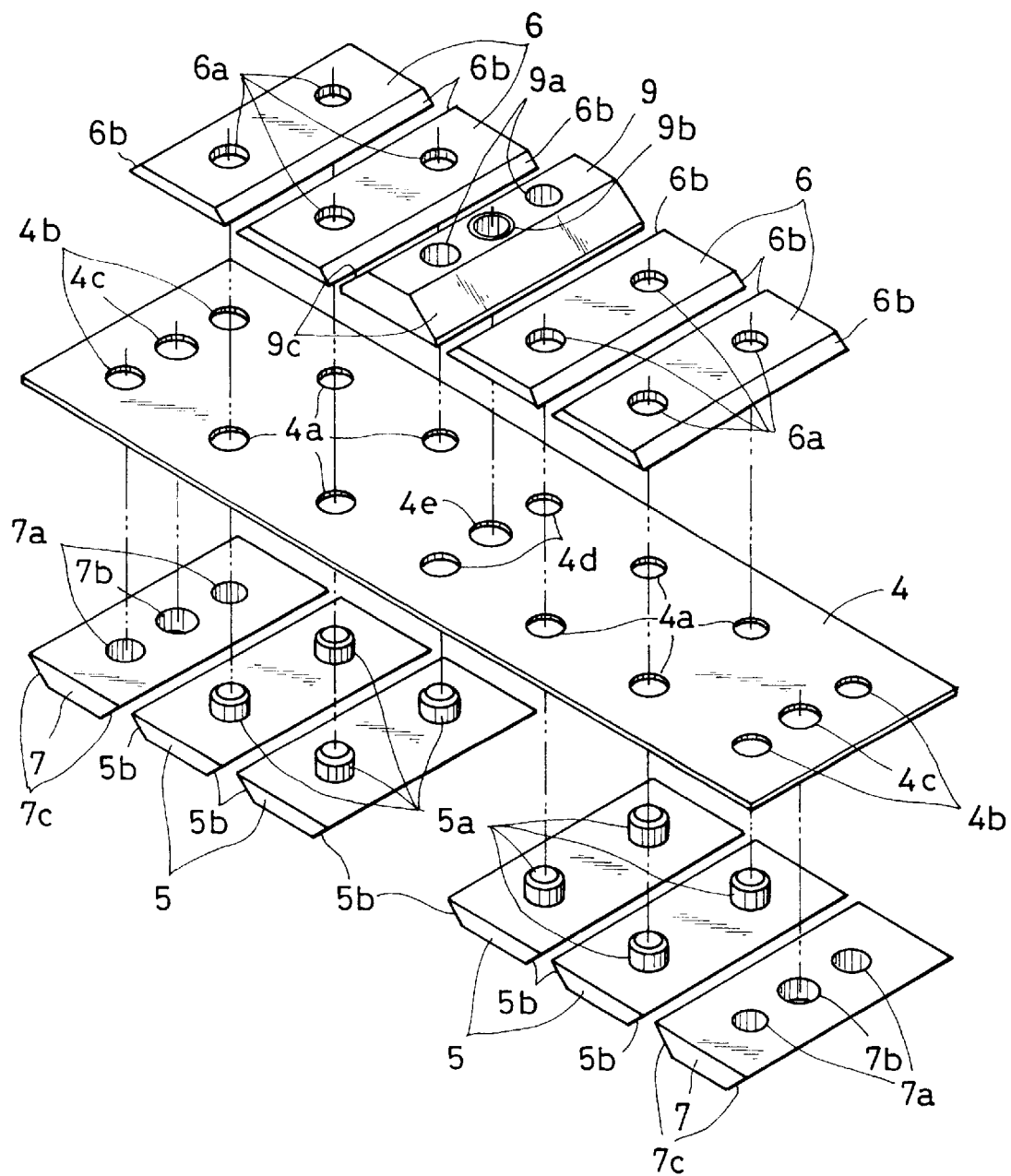
FIG. 11 is an exploded perspective view of a lens support member for supporting a movable member in FIG. 9.

FIG. 9 is an exploded perspective view of a lens shifting device according to a second embodiment of the present invention, FIG. 10 is a sectional view cut along a two-dot-chain line X—X in FIG. 9, FIG. 11 is an exploded perspective view of a lens support member for supporting a movable member (which holds a compensating lens) in FIG. 9, and FIGS. 12 to 15 are front views showing motion (or different states) of the lens shifting device according to the second embodiment of the present invention, as viewed from the side of an object to be photographed. Note that the anti-deviation system has the same schematic construction as that shown in FIG. 4. Also, the same components as those in the above first embodiment are denoted by reference numerals given by deducting 100 from the corresponding numerals used in the first embodiment.

A compensating lens shift mechanism shown in FIGS. 9 to 11 differs from the shift mechanism in the above first embodiment in that a pair of lens support members 4*u* are disposed in opposing relation. The remaining structure is the same as in the first embodiment.

Specifically, the pair of opposing lens support members 4*u* are each constructed in the form of a3-articulation link having hinge portions 4*h* which are elongate in the direction of the optical axis Z, and support a movable member unit 2*u* such that the movable member unit 2*u* is freely movable in a plane perpendicular to the direction of the optical axis Z while it is restrained from displacing in the direction of the optical axis Z. Further, the pair of lens support members 4*u* are each given with an original shape so curved as to hold a compensating lens 3 in a neutral position where the lens 3 is not shifted with respect to the optical axis Z.

Then, the movable member unit 2*u* is movable in the pitch direction p and the yaw direction y independently, and can be freely moved to any desired resultant position defined in terms of both the pitch and yaw directions within a predetermined allowable shift range.

Figure 12:
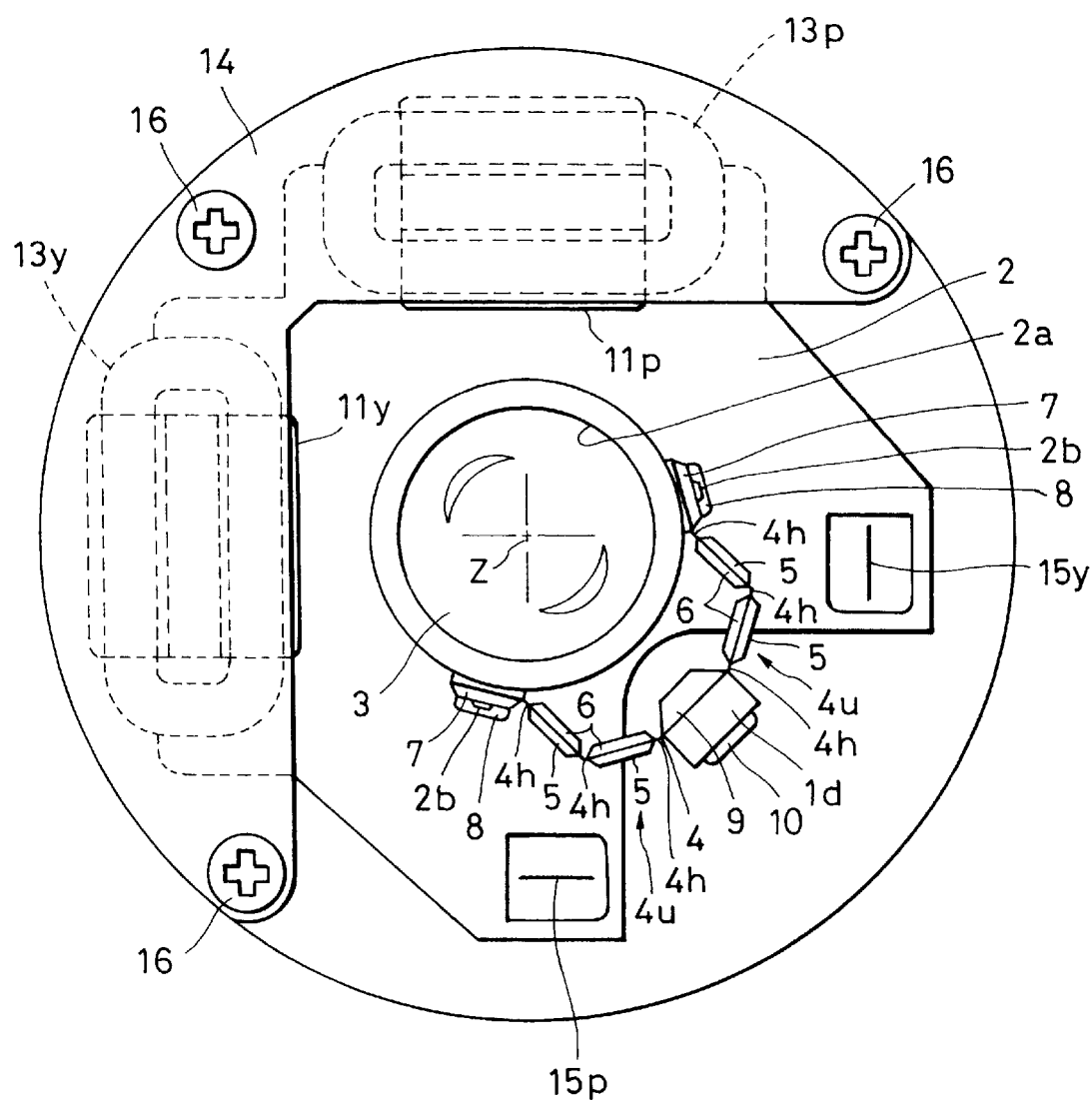
FIG. 12 is a front view showing an initial state of the lens shifting device according to the second embodiment of the present invention, as viewed from the side of an object to be photographed.
Figure 13:
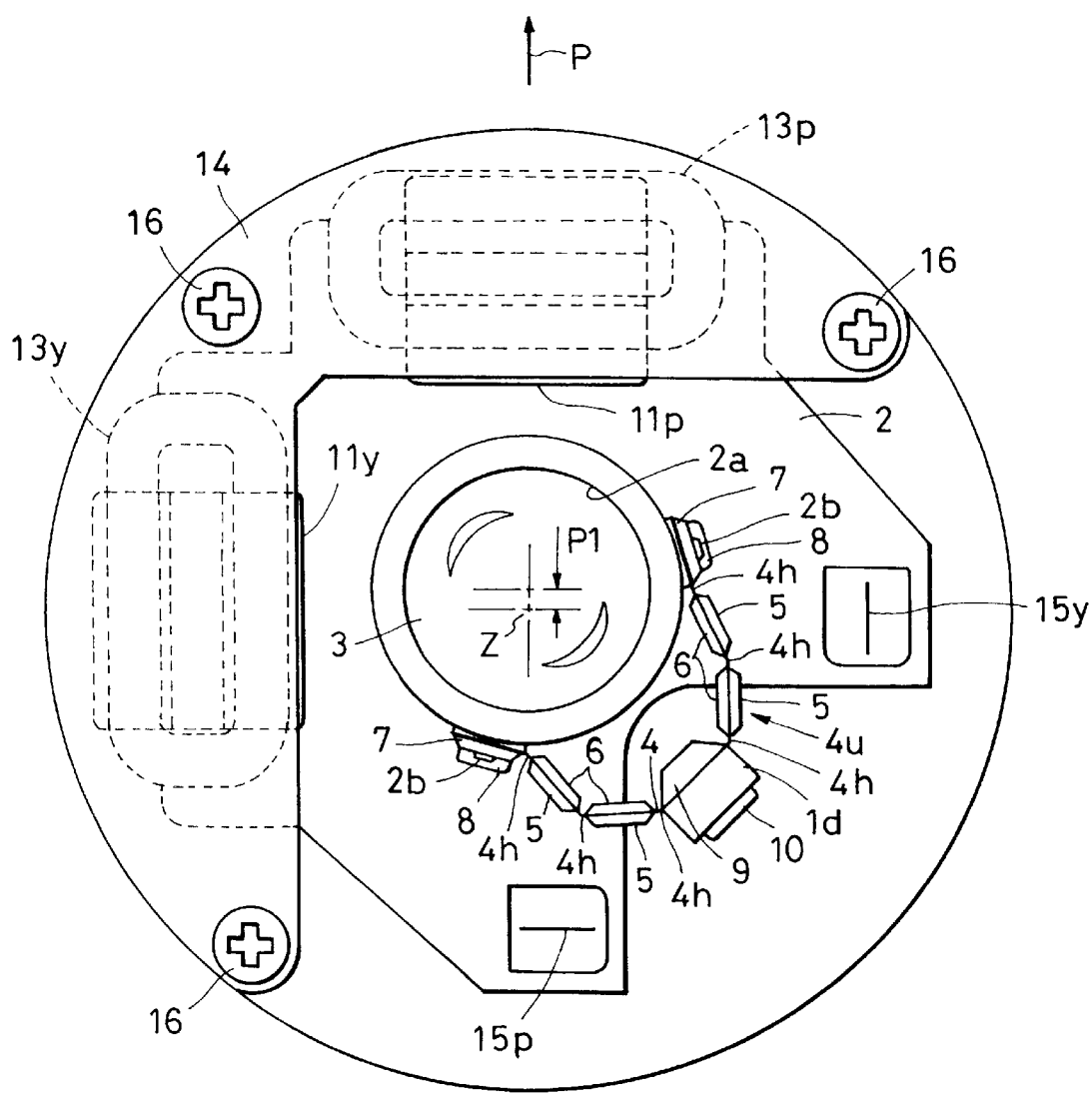
FIG. 13 is a front view showing a state where the movable member is moved in a pitch direction from the state of FIG. 12, as viewed from the side of an object to be photographed.

In the above-described construction, when the driving target signal representing a component in the pitch direction is applied to a pitch coil 13*p* under a normal state where the compensating lens 3 is held in the neutral position not shifted with respect to the optical axis Z as shown in FIG. 12, an electromagnetic force acting in the pitch direction is produced. Accordingly, as shown in FIG. 13, the movable member unit 2*u* causes the pair of lens support members 4*u* to deform against slight resistance specific to the lens support members 4*u* and shift by a predetermined amount P1 in the pitch direction (indicated by arrow P in FIG. 13).

Figure 14:
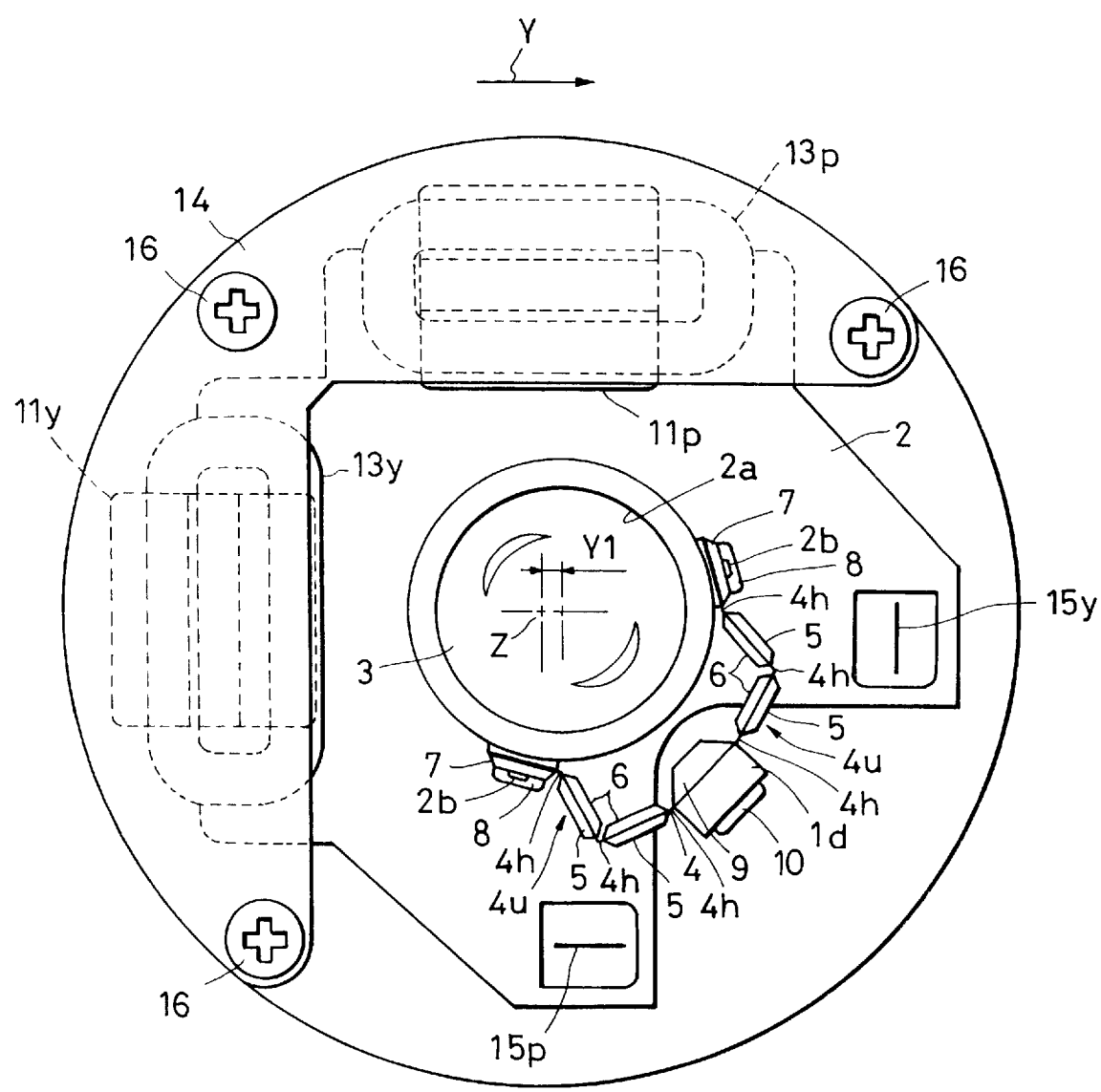
FIG. 14 is a front view showing a state where the movable member is moved in a yaw direction from the state of FIG. 12, as viewed from the side of an object to be photographed.

Also, when the driving target signal representing a component in the yaw direction is applied to a yaw coil 13*y* under the neutral state of FIG. 12, an electromagnetic force acting in the yaw direction is produced. Accordingly, as shown in FIG. 14, the movable member unit 2*u* causes the pair of lens support members 4*u* to deform against slight resistance specific to the lens support members 4*u* and shift by a predetermined amount Y1 in the yaw direction (indicated by arrow Y in FIG. 14).

Figure 15:
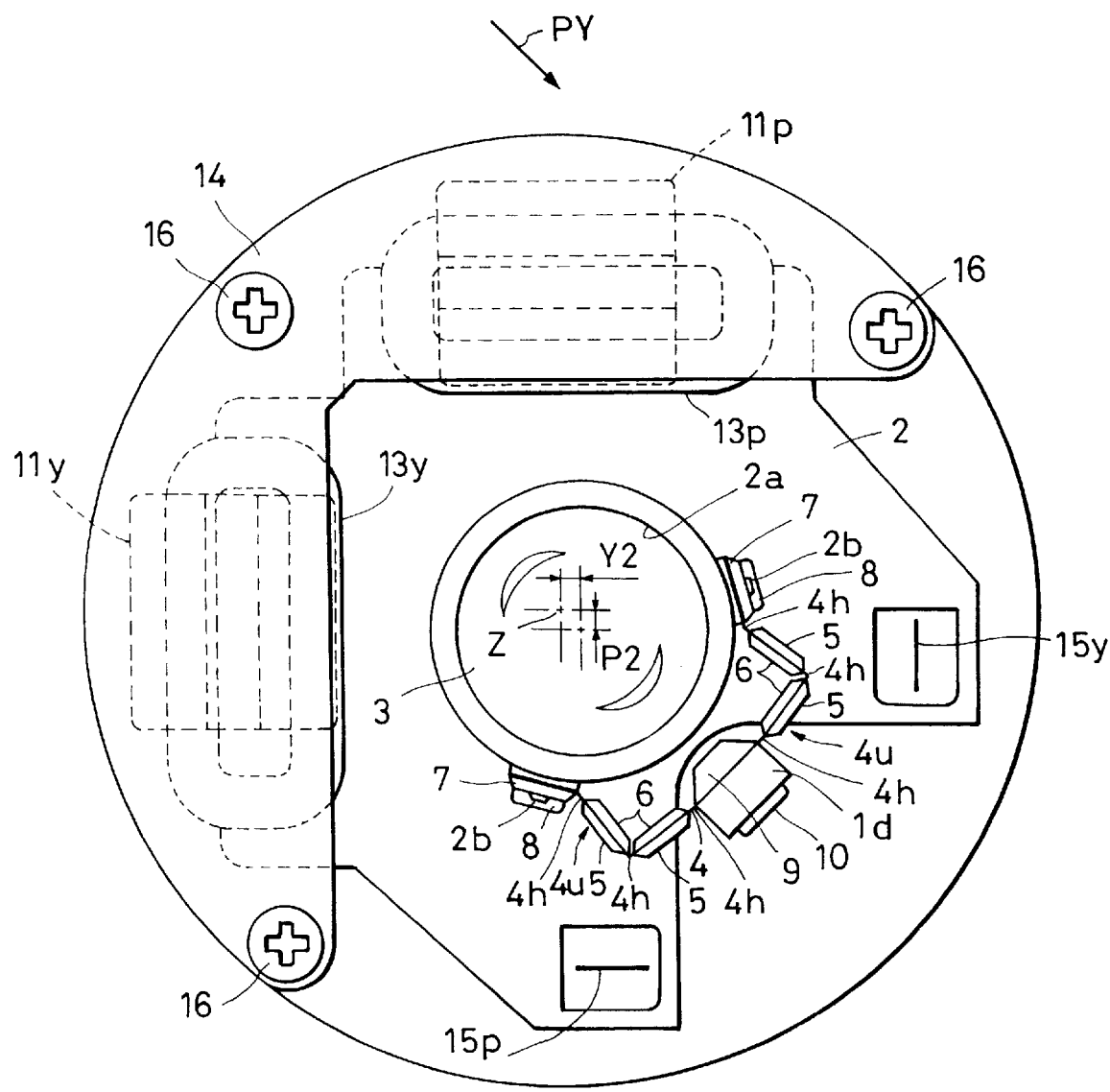
FIG. 15 is a front view showing a state where the movable member is moved to a resultant position defined in terms of both the pitch and yaw directions from the state of FIG. 12, as viewed from the side of an object to be photographed.

Further, when the driving target signals representing a resultant position defined in terms of both the pitch and yaw directions are applied to the pitch coil 13*p* and the yaw coil 13*y* under the neutral state of FIG. 12, electromagnetic forces acting in a direction toward the resultant position are produced. Accordingly, as shown in FIG. 15, the movable member unit 2*u* causes the pair of lens support members 4*u* to deform against slight resistance specific to the lens support members 4*u* and shift to the resultant position, i.e., by a predetermined amount P2 in the pitch direction and a predetermined amount Y2 in the yaw direction, (indicated by arrow PY in FIG. 15).

With the cooperation of a not-shown light emitting device and a not-shown light receiving device disposed respectively in correspondence with the pitch slit 15*p* and the yaw slit 15*y*, the position of the movable member unit 2*u* is detected in both the pitch and yaw directions to form a closed loop for feeding back, to the driving target signals, information as to whether the movable member unit 2*u* is shifted to the target position.

As described above, since the movable member unit 2*u* is supported by the pair of opposing lens support members 4*u*, which are each attached to a post 1*d* on a stationary member 1 and is in the form of a3-articulation link with the hinge portions 4*h* being elongate in the direction of the optical axis, in such a condition that the movable member unit 2*u* is held parallel to the direction of the optical axis without including any play in the direction of the optical axis, the movable member unit 2*u* is allowed to freely shift in the plane perpendicular to the optical axis. Additionally, since the pair of lens support members 4*u* are disposed in opposing relation, the movable member unit 2*u* is more positively restrained from moving with respect to the direction of the optical axis.

In the light flux deflecting device of the present invention, therefore, optical performance of the device is very hardly deteriorated due to, e.g., tilting of the movable member with respect to the optical axis and a play involved in the shift mechanism. Further, since a very thin flexible sheet providing much smaller resistance than frictional resistance caused by slide motion between a shaft and a bearing is used as a hinge, the shift driving force required for electromagnetically driving the movable member unit 2*u* can be reduced. In addition, since each lens support member 4*u* in the form of a3-articulation link enables the movable member unit 2*u* to be moved with greater flexibility within a larger region in spite of a relatively small size, the use of the lens support member 4u is suitable for reducing the device size.

Moreover, in the above first embodiment, the movable member unit 102u is apt to rotate about the optical axis because the movable member unit 102u is supported by only one lens support member 104u. Taking into account such a drawback, in this second embodiment, since the movable member unit 2u is supported by a pair of opposing lens support members 4u in a more balanced manner, the movable member unit 2u is more positively restrained from rotating about the optical axis and shift position control for the compensating lens can be achieved with higher accuracy.

Third Embodiment

Figure 16:
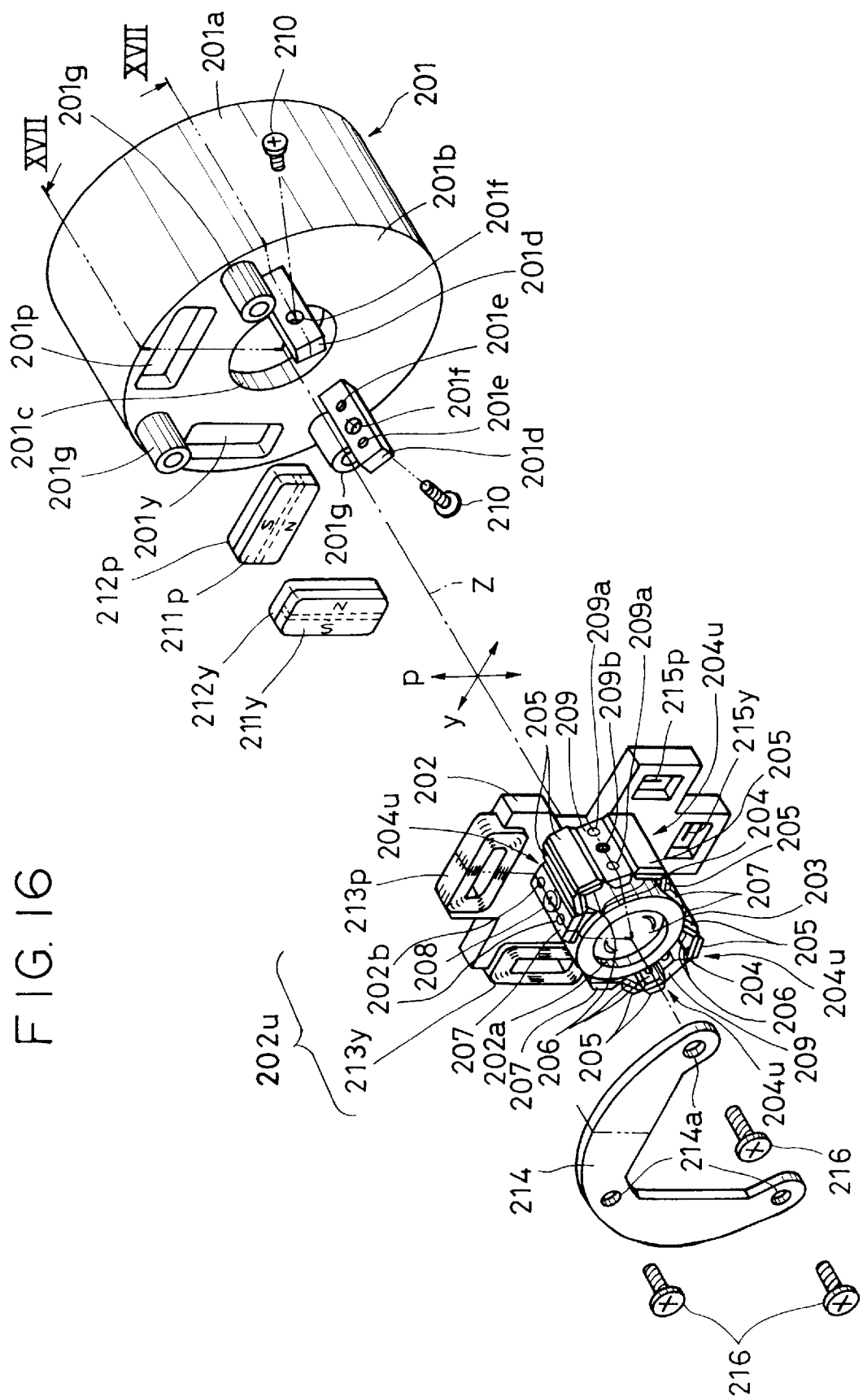
FIG. 16 is an exploded perspective view of a lens shifting device according to a third embodiment of the present invention.
Figure 17:
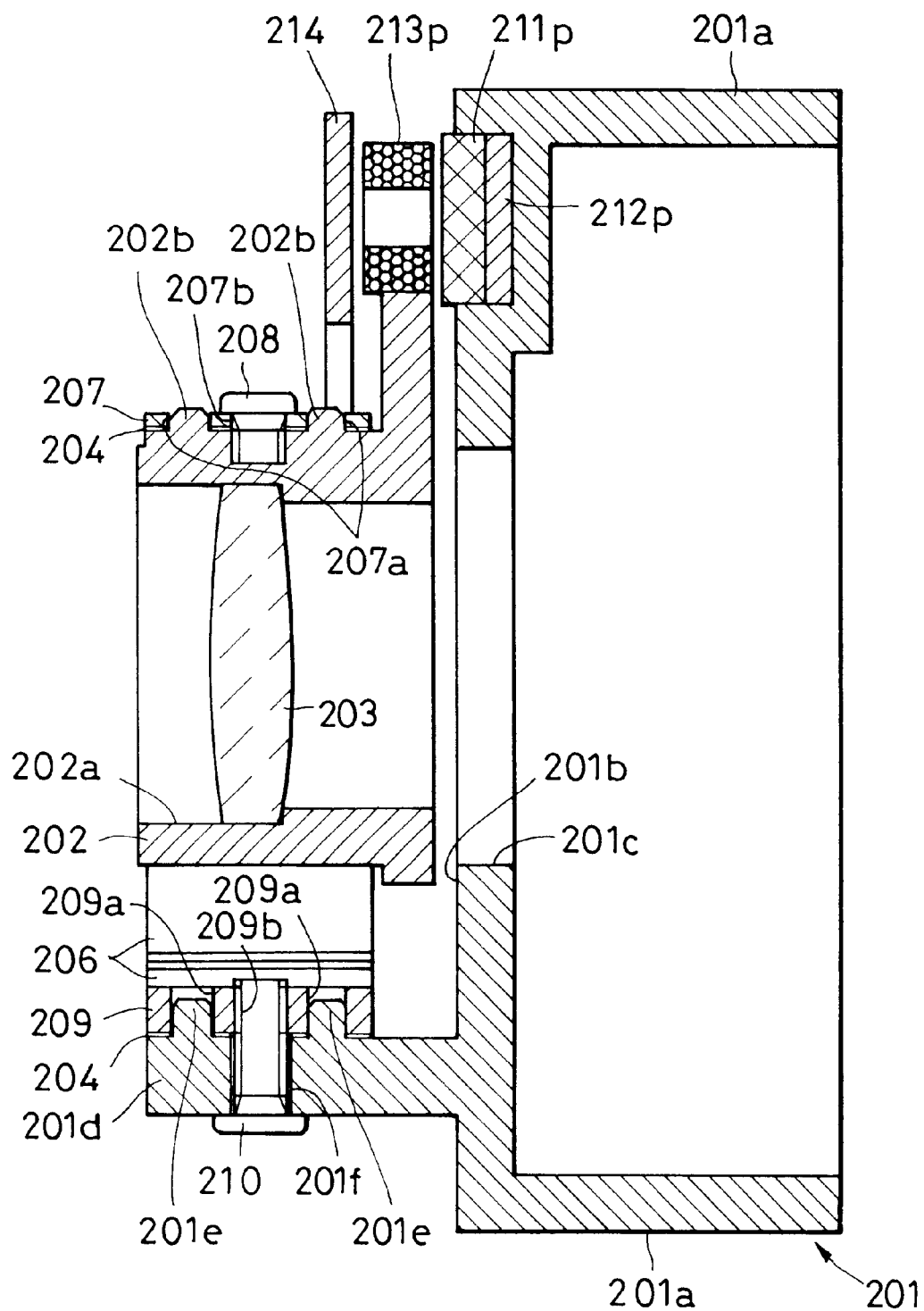
FIG. 17 is a sectional view cut along a two-dot-chain line XVII—XVII in FIG. 16.
Figure 18:
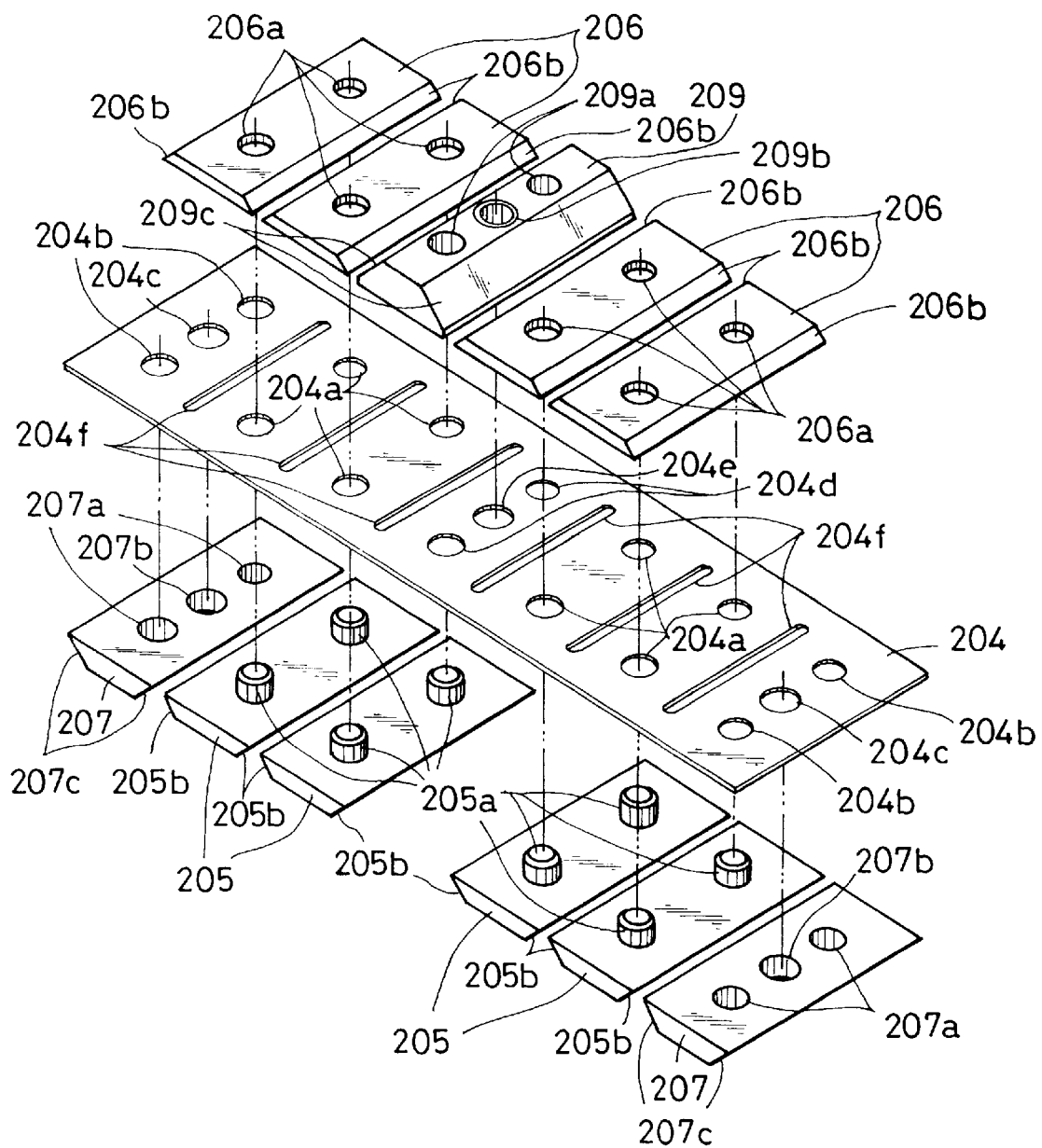
FIG. 18 is an exploded perspective view of a lens support member for supporting a movable member in FIG. 16.

FIG. 16 is an exploded perspective view of a lens shifting device according to a third embodiment of the present invention, FIG. 17 is a sectional view cut along a two-dot-chain line XVII—XVII in FIG. 16, FIG. 18 is an exploded perspective view of a lens support member for supporting a movable member (which holds a compensating lens) in FIG. 16, and FIGS. 19 to 22 are front views showing motion (or different states) of the lens shifting device according to the third embodiment of the present invention, as viewed from the side of an object to be photographed. Note that an anti-deviation system has the same schematic construction as that shown in FIG. 4. Also, the same components as those in the above first embodiment are denoted by reference numerals given by adding 100 to the corresponding numerals used in the first embodiment (i.e., reference numerals on the order of 200).

A compensating lens shift mechanism shown in FIGS. 16 to 18 differs from the shift mechanism in the above first embodiment in that, in addition to one set of paired opposing lens support members 204u similar to those used in the above second embodiment, another set of paired opposing lens support members 204u is disposed in diametrically opposing relation to the one set with the optical axis Z between the two sets, and a very thin flexible sheet 204 made of a synthetic resin material has an elongated hole 204f (see FIG. 18) formed in a flexing hinge portion to reduce a width of the hinge portion along which it deforms in practical use, thereby reducing resistance against deformation of the flexible sheet 204 so as to compensate for an increase in resistance against deformation which results from providing four (two sets of) lens support members 204u. The remaining structure is the same as in the first embodiment.

Specifically, the four (two sets of) opposing lens support members 204u are each constructed in the form of a3-articulation link having hinge portions 204h which are elongated in the direction of the optical axis Z, and support a movable member unit 202u such that the movable member unit 202u is freely movable in a plane perpendicular to the direction of the optical axis Z while it is restrained from displacing in the direction of the optical axis Z. Further, the four (two sets of) lens support members 204u are each provided with an original shape curved so as to hold a compensating lens 203 in a neutral position where the lens 203 is not shifted with respect to the optical axis Z.

Then, the movable member unit 202u is movable in the pitch direction p and the yaw direction y independently, and can be freely moved to any desired resultant position defined in terms of both the pitch and yaw directions within a predetermined allowable shift range.

Figure 19:
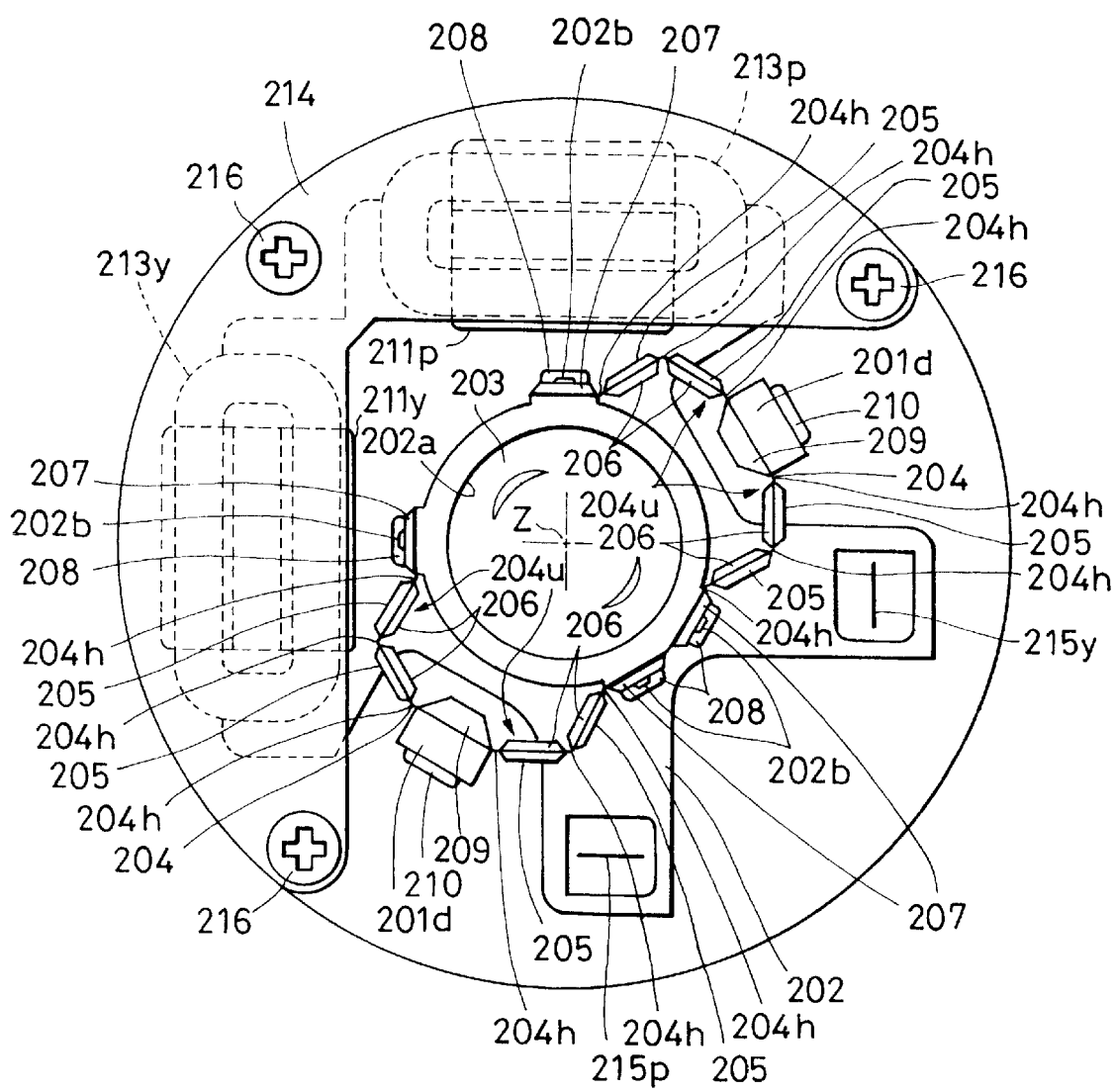
FIG. 19 is a front view showing an initial state of the lens shifting device according to the third embodiment of the present invention, as viewed from the side of an object to be photographed.
Figure 20:
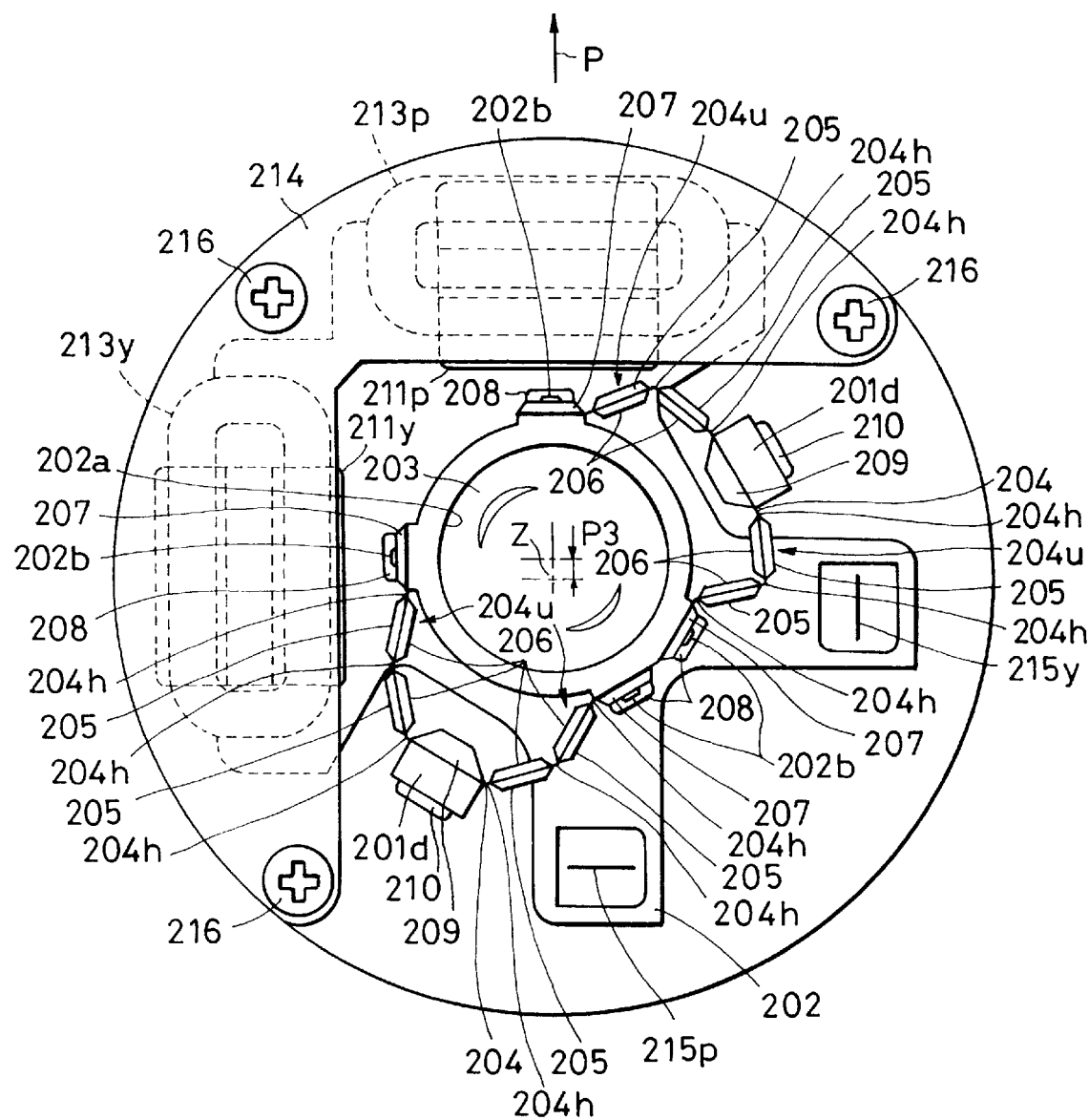
FIG. 20 is a front view showing a state where the movable member is moved in a pitch direction from the state of FIG. 19, as viewed from the side of an object to be photographed.

In the above-described construction, when the driving target signal representing a component in the pitch direction is applied to a pitch coil 213p under a normal state where the compensating lens 203 is held in the neutral position not shifted with respect to the optical axis Z as shown in FIG. 19, an electromagnetic force acting in the pitch direction is produced. Accordingly, as shown in FIG. 20, the movable member unit 202u causes the four (two sets of) lens support members 204u to deform against slight resistance specific to the lens support members 204u and shift by a predetermined amount P3 in the pitch direction (indicated by arrow P in FIG. 20).

Figure 21:
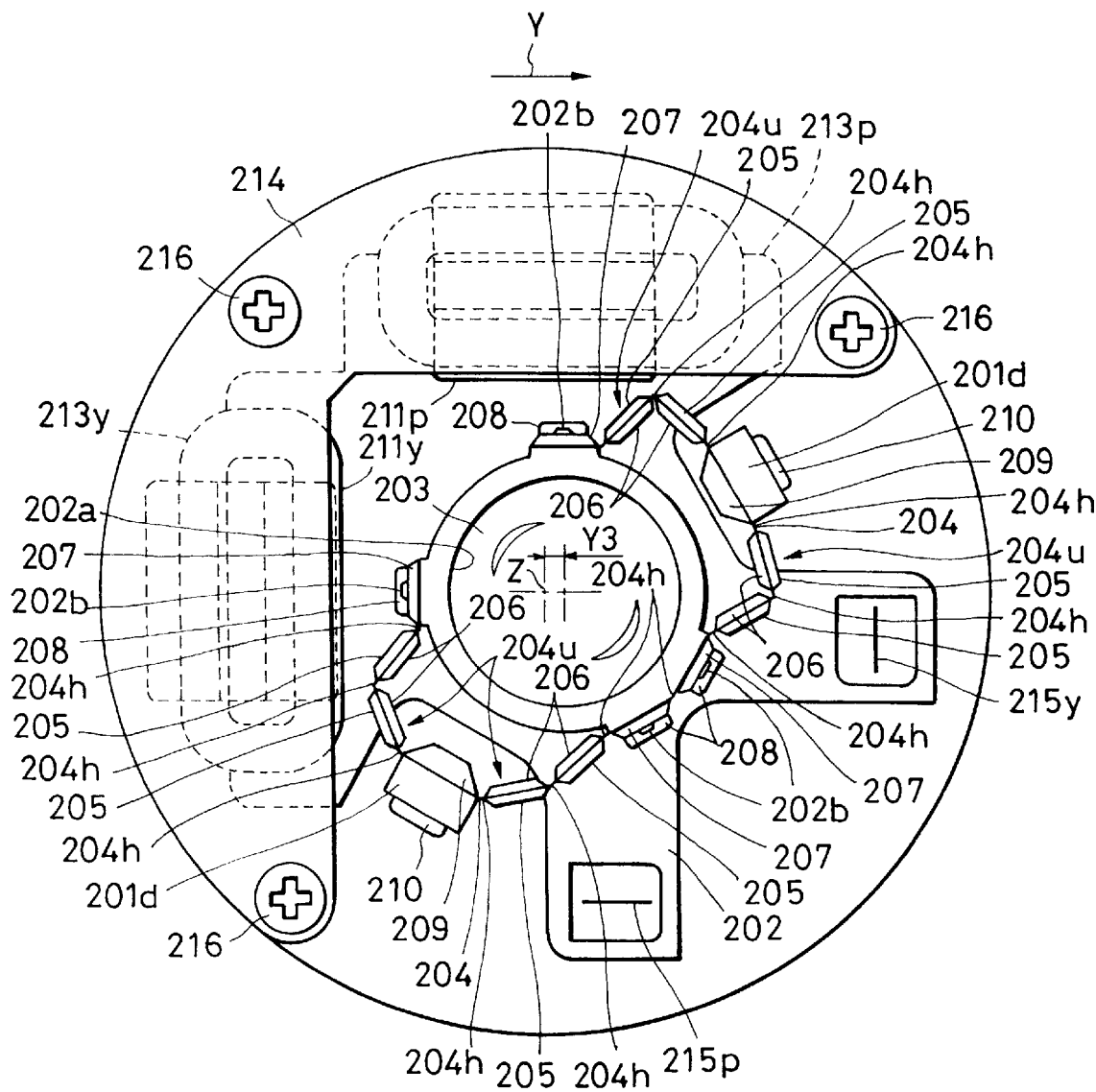
FIG. 21 is a front view showing a state where the movable member is moved in a yaw direction from the state of FIG. 19, as viewed from the side of an object to be photographed.

Also, when the driving target signal representing a component in the yaw direction is applied to a yaw coil 213y under the neutral state of FIG. 19, an electromagnetic force acting in the yaw direction is produced. Accordingly, as shown in FIG. 21, the movable member unit 202u causes the four (two sets of) lens support members 204u to deform against slight resistance specific to the lens support members 204u and shift by a predetermined amount Y3 in the yaw direction (indicated by arrow Y in FIG. 21).

Figure 22:
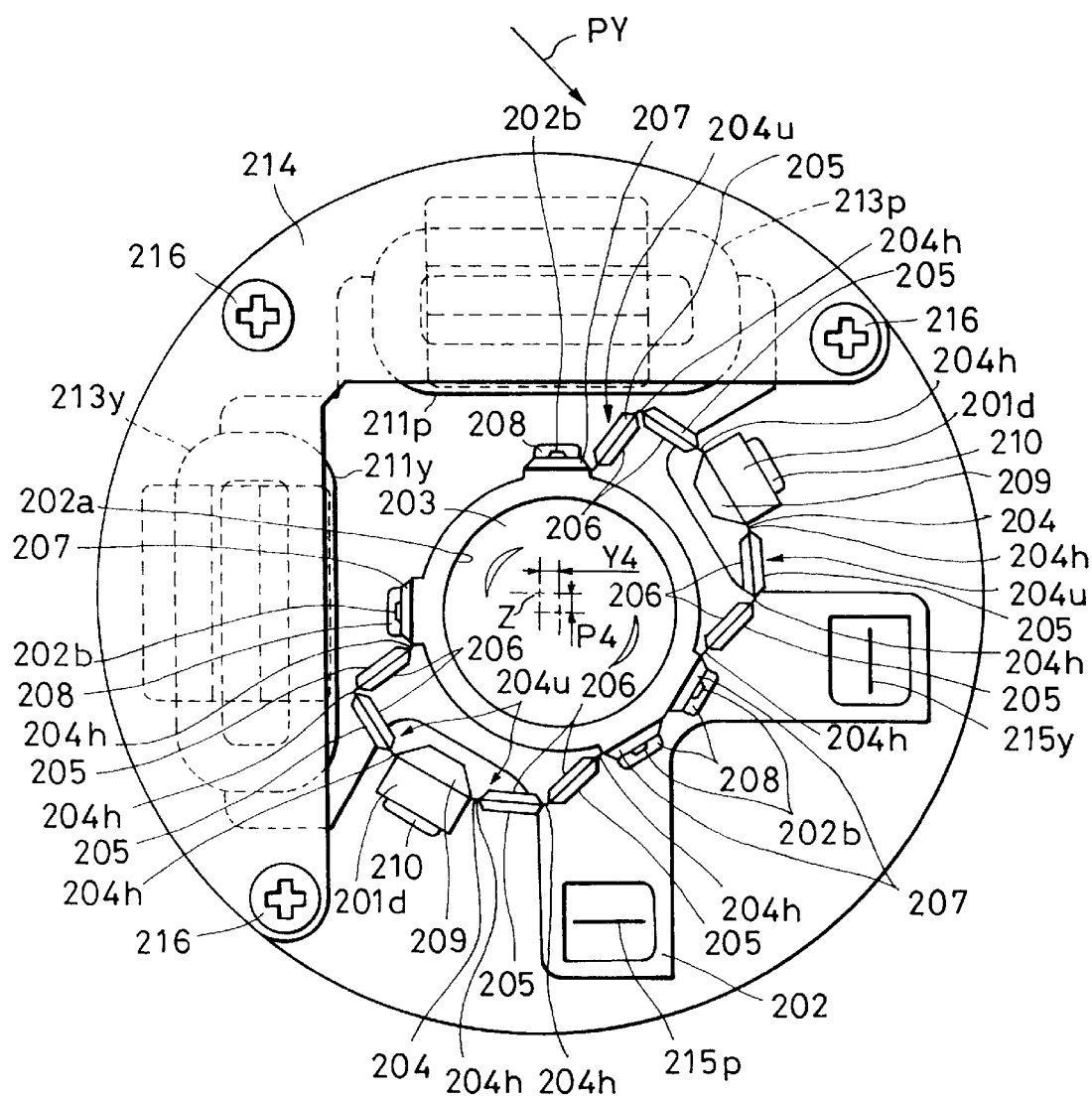
FIG. 22 is a front view showing a state where the movable member is moved to a resultant position defined in terms of both the pitch and yaw directions from the state of FIG. 19, as viewed from the side of an object to be photographed.

Further, when the driving target signals representing a resultant position defined in terms of both the pitch and yaw directions are applied to the pitch coil 213p and the yaw coil 213y under the neutral state of FIG. 19, electromagnetic forces acting in a direction toward the resultant position are produced. Accordingly, as shown in FIG. 22, the movable member unit 202u causes the four (two sets of) lens support members 204u to deform against slight resistance specific to the lens support members 204u and shift to the resultant position, i.e., by a predetermined amount P4 in the pitch direction and a predetermined amount Y4 in the yaw direction, (indicated by arrow PY in FIG. 22).

With the cooperation of a not-shown light emitting device and a not-shown light receiving device disposed respectively corresponding to the pitch slit 215p and the yaw slit 215y, the position of the movable member unit 202u is detected in both the pitch and yaw directions to form a closed loop for feeding back, to the driving target signals, information as to whether the movable member unit 202u is shifted to the target position.

As described above, since the movable member unit 202u is supported by the four (two sets of) opposing lens support members 204u, which are attached to a pair of posts 201d on a stationary member 201 and are each in the form of a3-articulation link with the hinge portions 204h being elongated in the direction of the optical axis, in such a condition that the movable member unit 202u is held parallel to the direction of the optical axis without including any play in the direction of the optical axis, the movable member unit 202u is allowed to freely shift in the plane perpendicular to the optical axis. Additionally, since the four (two sets of) lens support members 204u are disposed in opposing relation, the movable member unit 202u is more positively restrained from moving with respect to the direction of the optical axis.

In the light flux deflecting device of the present invention, therefore, optical performance of the device is very hardly deteriorated due to, e.g., tilting of the movable member with respect to the optical axis and a play involved in the shift mechanism. Further, since a very thin flexible sheet providing much smaller resistance than frictional resistance caused by slide motion between a shaft and a bearing is used as a hinge, and the flexible sheet has elongated holes 204f formed in each flexing hinge portion to reduce the width of the hinge portion along which it deforms in practical use, thereby reducing resistance against deformation of the flexible sheet, the shift driving force required for electromagnetically driving the movable member unit 202u can be reduced. In addition, since each lens support member 204u in the form of a3-articulation link enables the movable member unit 202u to be moved with greater flexibility within a larger region in spite of a relatively small size, the use of the lens support member 204u is suitable for reducing the device size.

Moreover, in the above first embodiment, the movable member unit 102u is apt to rotate about the optical axis because the movable member unit 102u is supported by only one lens support member 104u. Taking into account such a drawback, in this third embodiment, since the movable member unit 202u is supported by the four (two sets of) opposing lens support members 204u in a more balanced manner, the movable member unit 202u is more positively restrained from rotating about the optical axis and shift position control for the compensating lens can be achieved with higher accuracy.

Fourth Embodiment

Figure 23:
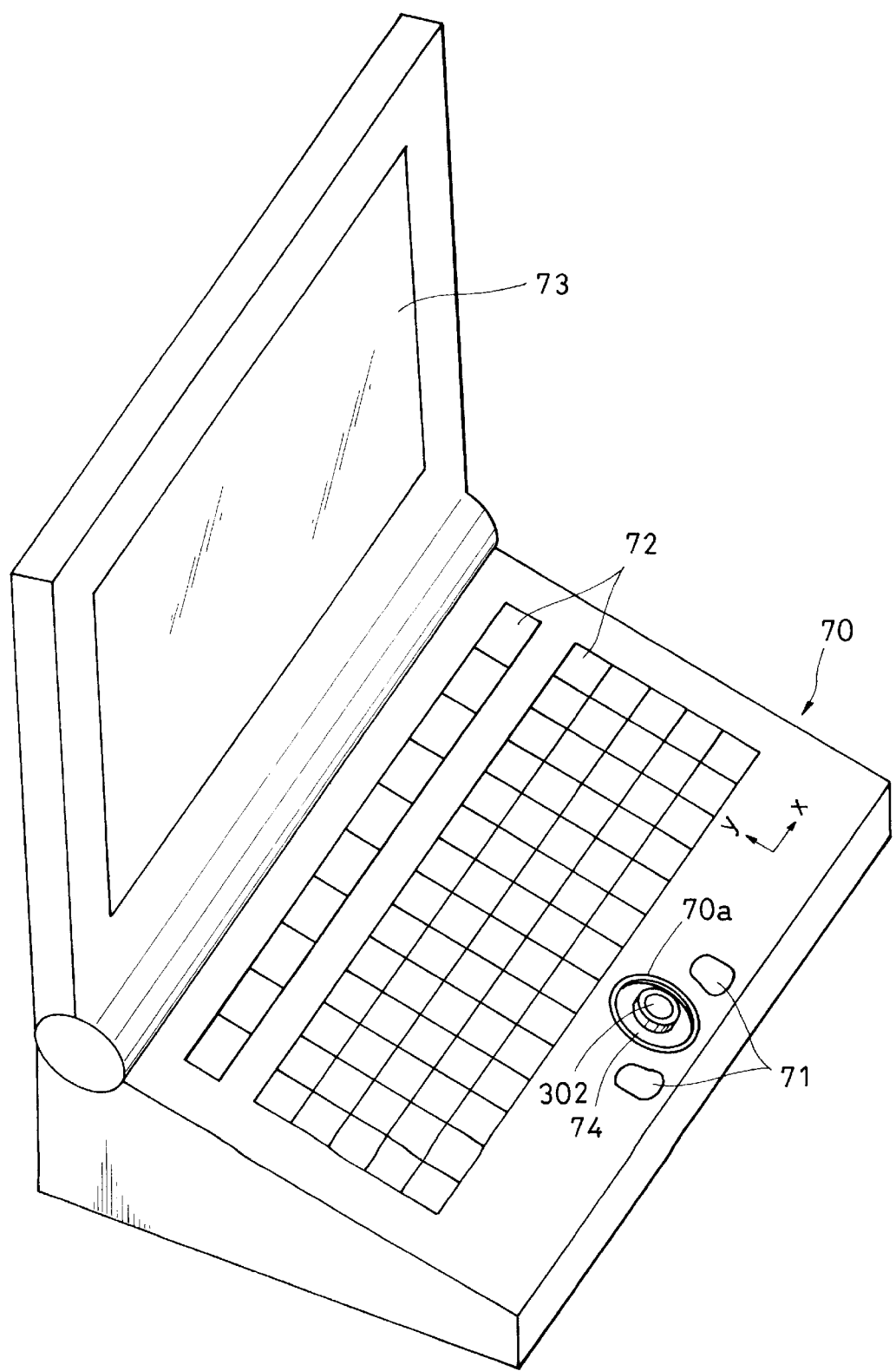
FIG. 23 is a perspective view of a small-sized computer provided with an input device according to a fourth embodiment of the present invention.
Figure 24:
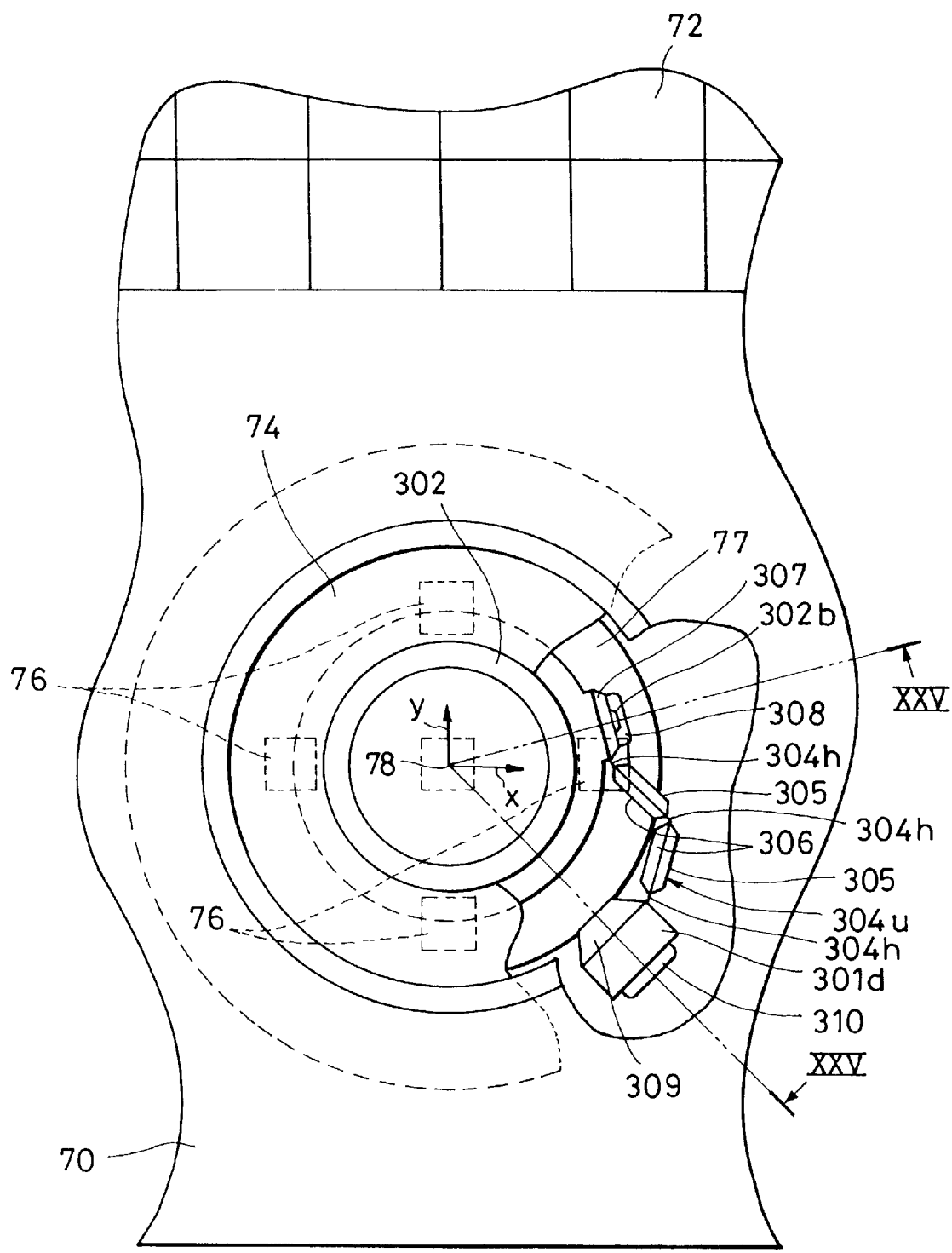
FIG. 24 is an enlarged view of a principal part of the input device provided in the small-sized computer of FIG. 23.
Figure 25:
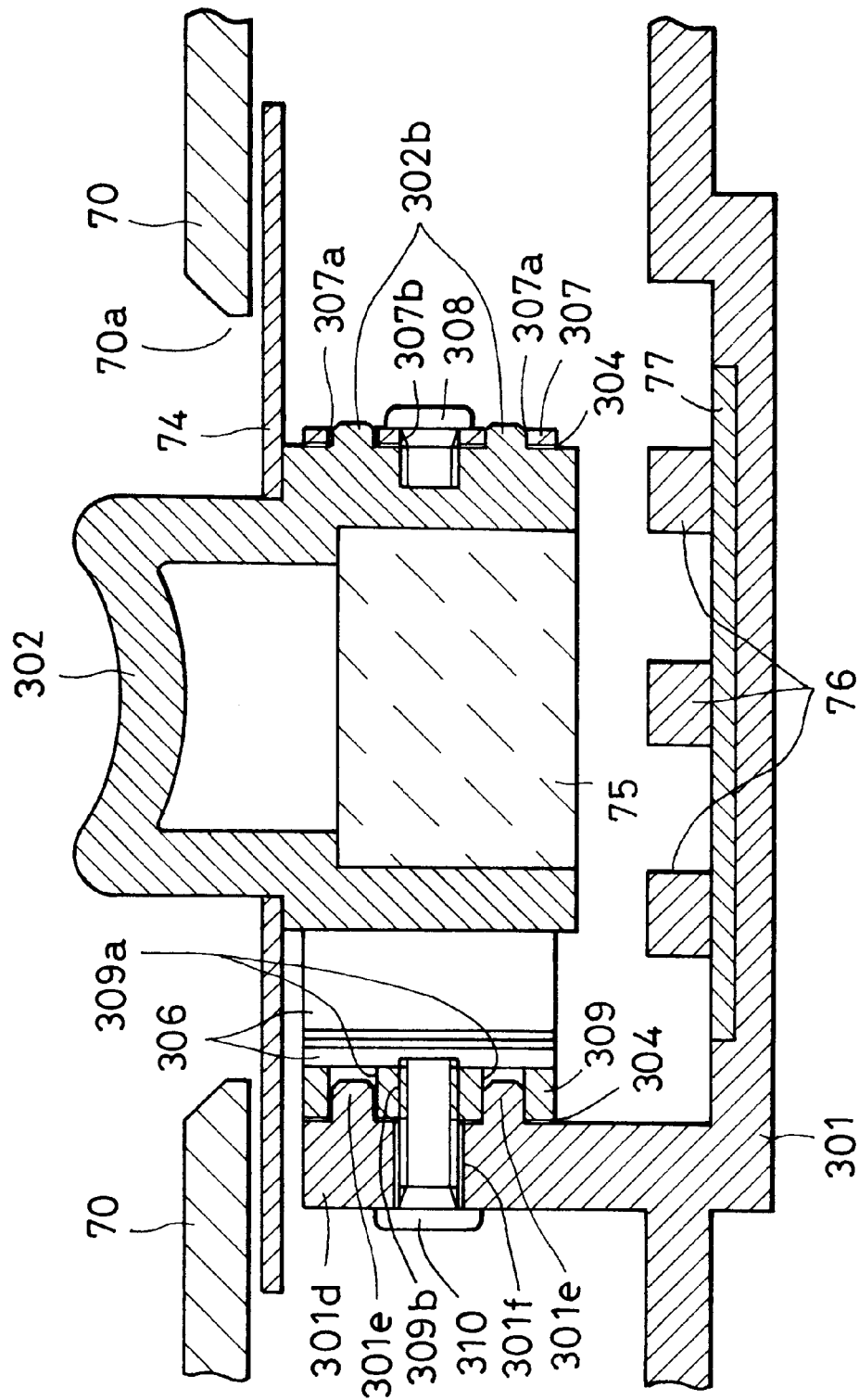
FIG. 25 is a sectional view of the input device cut along a two-dot-chain line XXV—XXV in FIG. 24.

FIG. 23 is a perspective view of a small-sized computer provided with an input device according to a fourth embodiment of the present invention, FIG. 24 is an enlarged view (partly broken away for the sake of explanation) of a principal part of the input device provided in the small-sized computer, and FIG. 25 is a sectional view of the input device cut along a two-dot-chain line XXV—XXV in FIG. 24. Note that equivalent components to those in the above first embodiment are denoted by reference numerals given by adding 200 to the corresponding numerals used in the first embodiment (i.e., reference numerals on the order of 300).

In FIGS. 23 to 25, denoted by 70 is a computer body and 301 is a stationary member. Denoted by 302 is a columnar control member which is held by the computer body 70 to be movable in a plane and corresponds to movable means. The control member 302 is projected to the outside through a hole 70a formed in the computer body 70, and has a recess formed in its upper end surface, allowing the operator to put a finger in the recess for operation. Upon the control member 302 being operated, a cursor or pointer is moved on a display screen 73 correspondingly. Denoted by 71 is a click or double click button, and 72 is an entry key. Denoted by 74 is a shield plate fixed to the control member 302 and dimensioned so that even when the control member 302 is maximally displaced, the hole 70a in the computer body 70 is closed so as not only to prevent contaminants from entering the computer body 70, but also to conceal the internal structure against viewing from the outside. Denoted by 75 is a permanent magnet fixed to the control member 302, and 76 is a magneto-electric transducer disposed in each of five positions, i.e., a neutral position of the control member 302 and four points on x- and y-directions with the neutral position serving as the origin, the four points being spaced from the origin by equal distances. Denoted by 77 is a printed circuit board on which the magneto-electric transducers are mounted, and 78 is the neutral position of the control member 302. The remaining components associated with a support member are the same as those in the above first embodiment (the exploded perspective view of FIG. 3 is equally applied to the support member in this fourth embodiment).

Then, a support member 304u is constructed in the form of a3-articulation link having hinge portions 304h (see FIG. 24) which are elongated in a direction perpendicular to the plane in which the control member 302 is movable, and supports the control member 302 such that the control member 302 is restrained from displacing in the direction perpendicular to the plane in which the control member 302 is movable, while it is freely movable in that plane. Further, the support member 304u is provided with an original shape curved so as to hold the control member 302 in the neutral position.

In the above-described construction, when the operator puts a finger on the control member 302 and moves it in any desired direction on the plane, the magneto-electric transducers 76 detect a change in magnetic field produced by the permanent magnet 75 fixed to the control member 302, and the cursor or pointer on the display screen 73 is moved in accordance with detection outputs from the magneto-electric transducers 76.

Thus, since the control member 302 is supported by the support member 304u, which is attached to the post 301d on the stationary member 301 and is in the form of a 3-articulation link with the hinge portions 304h being elongated in the direction perpendicular to the plane in which the control member 302 is movable, in such a condition that the control member 302 is held parallel to the direction perpendicular to the plane in which the control member 302 is movable without including any play in the same direction, the control member 302 is allowed to freely shift in that plane. Accordingly, smoothness of motion of the control member 302 is hardly deteriorated due to, e.g., tilting of the movable means and a play involved in the shift mechanism. Further, since a very thin flexible sheet providing much smaller resistance than frictional resistance caused by slide motion between a shaft and a bearing is used as a hinge, the operating force required for shifting the control member 302 can be reduced. In addition, since the support member 304u in the form of a3-articulation link enables the control member 302 to be moved with greater flexibility within a larger region in spite of a relatively small size, the use of the support member 304u is suitable for reducing the device size.

Fifth Embodiment

Figure 26:
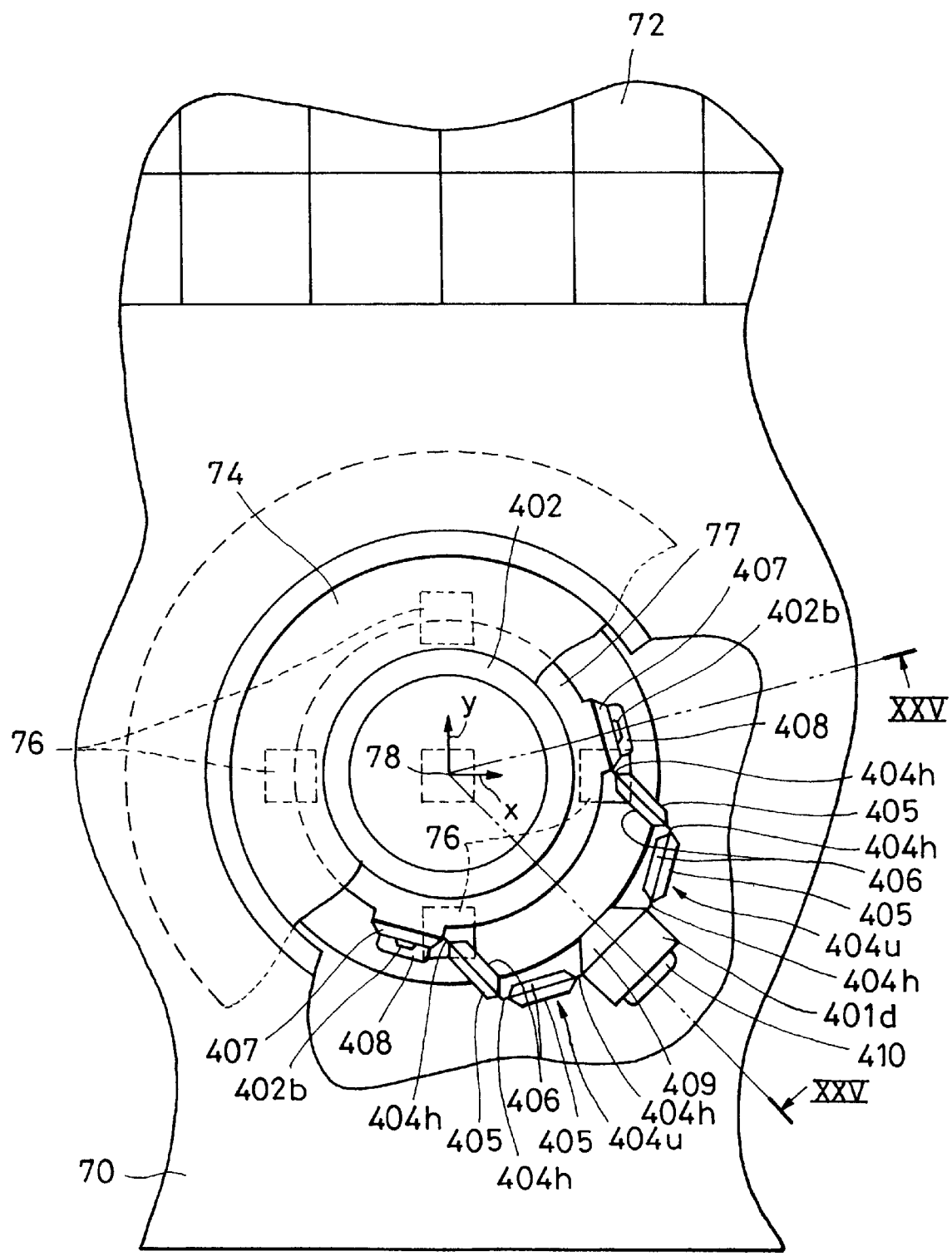
FIG. 26 is an enlarged view of a principal part of an input device according to a fifth embodiment of the present invention, the input device being provided in a small-sized computer.

FIG. 26 is an enlarged view (partly broken away for the sake of explanation) of a principal part of an input device, provided in a small-sized computer, according to a fifth embodiment of the present invention, and a sectional view of the input device cut along a two-dot-chain line XXV—XXV in FIG. 24 is the same as FIG. 25. Note that equivalent components to those in the above fourth embodiment are denoted by reference numerals given by adding 100 to the corresponding numerals used in the fourth embodiment (i.e., reference numerals on the order of 400).

A shift mechanism for a control member 402 (which corresponds to movable means) according to the fifth embodiment of the present invention differs from the shift mechanism in the above fourth embodiment in that a pair of support members 404u are disposed in opposing relation. The remaining structure is the same as in the fourth embodiment (the exploded perspective view of FIG. 11 is equally applied to the pair of support members in this fifth embodiment).

Specifically, the pair of opposing support members 404u are each constructed in the form of a3-articulation link having hinge portions 404h (see FIG. 26) which are elongated in a direction perpendicular to a plane in which the control member 402 is movable, and support the control member 402 such that the control member 402 is restrained from displacing in the direction perpendicular to the plane in which the control member 402 is movable, while it is freely movable in that plane. Further, the pair of support members 404u are each provided with an original shape curved so as to hold the control member 402 in the neutral position.

The input device having the above-described construction operates in a like manner to that of the fourth embodiment.

Thus, since the control member 402 is supported by the pair of opposing support members 404u, which are attached to a post 401d on a stationary member 401 and are each in the form of a3-articulation link with the hinge portions 404h being elongated in the direction perpendicular to the plane in which the control member 402 is movable, in such a condition that the control member 402 is held parallel to the direction perpendicular to the plane in which the control member 402 is movable without including any play in the same direction, the control member 402 is allowed to freely shift in that plane. In addition, since the pair of support members 404u are disposed in opposing relation, the control member 402 is more positively restrained from moving with respect to the direction perpendicular to the plane in which the control member 402 is movable.

Accordingly, smoothness of motion of the control member 402 is hardly deteriorated due to, e.g., tilting of the movable means and a play involved in the shift mechanism. Further, since a very thin flexible sheet providing much smaller resistance than frictional resistance caused by slide motion between a shaft and a bearing is used as a hinge, the operating force required for shifting the control member 402 can be reduced. In addition, since each support member 404u in the form of a 3-articulation link enables the control member 402 to be moved with greater flexibility within a larger region in spite of a relatively small size, the use of the support member 404u is suitable for reducing the device size.

Moreover, in the above fourth embodiment, the control member 302 is apt to rotate in the plane in which the control member 302 is movable, because the control member 302 is supported by one support member 304u. Taking into account such a drawback, in this fifth embodiment, since the control member 402 is supported by the pair of opposing support members 404u in a more balanced manner, the control member 402 is more positively restrained from rotating in the plane in which the control member 402 is movable, and control for movement of the cursor or pointer on the display screen 73 can be achieved with higher accuracy.

Sixth Embodiment

Figure 27:
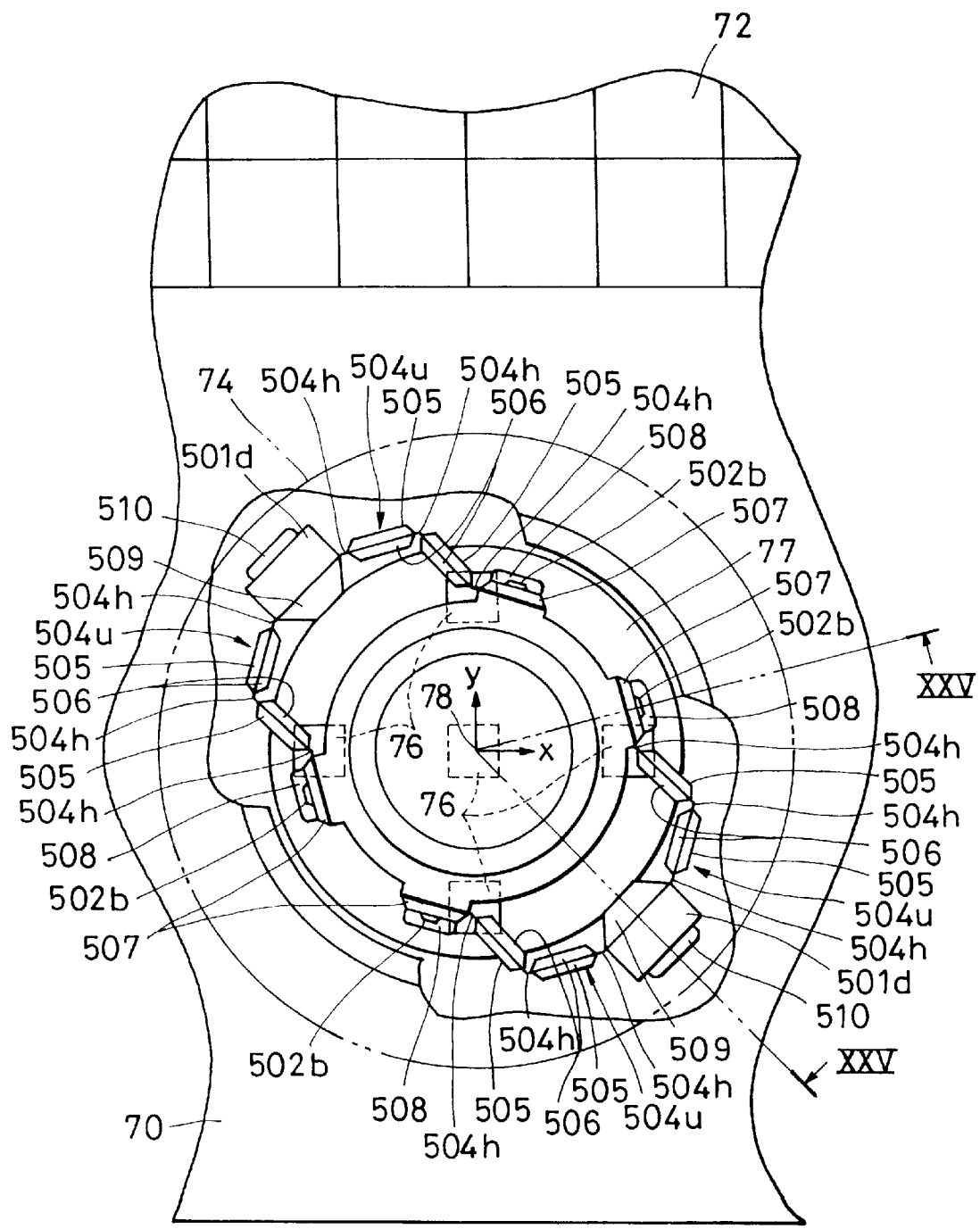
FIG. 27 is an enlarged view of a principal part of an input device according to a fifth embodiment of the present invention, the input device being provided in a small-sized computer.

FIG. 27 is an enlarged view (partly broken away for the sake of explanation) of a principal part of an input device, provided in a small-sized computer, according to a sixth embodiment of the present invention, and a sectional view of the input device cut along a two-dot-chain line XXV—XXV in FIG. 27 is the same as FIG. 25. Note that equivalent components to those in the above fourth embodiment are denoted by reference numerals given by adding 200 to the corresponding numerals used in the fourth embodiment (i.e., reference numerals on the order of 500).

A shift mechanism for a control member 502 (which corresponds to movable means) according to the sixth embodiment of the present invention differs from the shift mechanism in the above fourth embodiment in that, in addition to one set of paired opposing support members 504u similar to those used in the above fifth embodiment, another set of paired opposing support members 504u is disposed in diametrically opposing relation to the one set with a neutral position of the control member 502 between the two sets, and a very thin flexible sheet 504 made of a synthetic resin material has an elongated hole formed in a flexing hinge portion to reduce a width of the hinge portion along which it deforms in practical use, thereby reducing resistance against deformation of the flexible sheet 504 so as to compensate for an increase in resistance against the deformation which results from providing four (two sets of) support members 504u. The remaining structure is the same as in the fourth embodiment (the exploded perspective view of FIG. 18 is equally applied to each pair of support members in this sixth embodiment).

Specifically, the four (two sets of) opposing support members 504u are each constructed in the form of a3-articulation link having hinge portions 504h (see FIG. 27) which are elongated in a direction perpendicular to a plane in which the control member 502 is movable, and support the control member 502 such that the control member 502 is restrained from displacing in the direction perpendicular to the plane in which the control member 502 is movable, while it is freely movable in that plane. Further, the four (two sets of) support members 504u are each provided with an original shape curved so as to hold the control member 502 in the neutral position.

The input device having the above-described construction operates in a like manner to that of the fourth embodiment.

Thus, since the control member 502 is supported by the four (two sets of) opposing support members 504u, which are attached to a pair of posts 501d on a stationary member 501 and are each in the form of a3-articulation link with the hinge portions 504h being elongated in the direction perpendicular to the plane in which the control member 502 is movable, in such a condition that the control member 502 is held parallel to the direction perpendicular to the plane in which the control member 502 is movable without including any play in the same direction, the control member 502 is allowed to freely shift in that plane. In addition, since the four (two sets of) support members 504u are disposed in opposing relation, the control member 502 is more positively restrained from moving with respect to the direction perpendicular to the plane in which the control member 502 is movable.

Accordingly, smoothness of motion of the control member 502 is hardly deteriorated due to, e.g., tilting of the movable means and a play involved in the shift mechanism. Further, since a very thin flexible sheet providing much smaller resistance than frictional resistance caused by slide motion between a shaft and a bearing is used as a hinge, and the flexible sheet has elongated holes formed in each flexing hinge portion to reduce the width of the hinge portion along which it deforms in practical use, thereby reducing resistance against deformation of the flexible sheet, the operating force required for shifting the control member 502 can be reduced. In addition, since each support member 504u in the form of a3-articulation link enables the control member 502 to be moved with greater flexibility within a larger region in spite of a relatively small size, the use of the support member 504u is suitable for reducing the device size.

Moreover, in the above fourth embodiment, the control member 302 is apt to rotate in the plane in which the control member 302 is movable, because the control member 302 is supported by one support member 304u. Taking into account such a drawback, in this sixth embodiment, since the control member 502 is supported by the four (two sets of) opposing support members 504u in a more balanced manner, the control member 502 is more positively restrained from rotating in the plane perpendicular to the plane in which the control member 502 is movable, and control for movement of the cursor or pointer on the display screen 73 can be achieved with higher accuracy.

Modifications

In the embodiments described above, each support member is in the form of a 3-articulation link, but it may be constructed with an increased number, e.g., four, five and so on, of link articulations depending on a desired amount (region) of shift.

Also, while the support member is constructed by holding a very thin flexible sheet between rectangular rigid plates made of an aluminum alloy material or the like in closely sandwiched relation, the structure of the support member is not limited to the illustrated one.

Further, in the first, second, fourth and fifth embodiments, an elongated hole may be formed in each flexing hinge portion to reduce the width of the hinge portion along which the flexible sheet deforms in practical use, thereby reducing resistance against deformation of the flexible sheet.

Additionally, by changing the length of the elongated hole in the direction perpendicular to the plane in which the movable member is allowed to shift, the resistance against deformation of the support member can be set to any desired value.

With the embodiments described above, the following advantages can be obtained.

(1) The support member 104*u*, 4*u*, 204*u*, 304*u*, 404*u*, 504*u* includes at three hinge portions 104*h*, 4*h*, 204*h*, 304*h*, 404*h*, 504*h* which extend in the direction perpendicular to the plane in which the movable member 102, 2, 202 or the control member 302, 402, 502 is movable, for allowing the movable member or the control member to move in that plane while restraining it from moving in the direction perpendicular to that plane. Therefore, the compensating lens 103, 3, 203 or the control member 302, 402, 502 can be supported with a small-sized construction in such a manner so as to be able to freely move in the above-mentioned plane with smaller resistance in driving or operating the movable member or the control member. In addition, the movable member or the control member can maintain a proper posture because it is reliably and accurately held perpendicular to the optical axis or central axis without including any play in the direction perpendicular to the above-mentioned plane.

(2) Since the hinge portions 104*h*, 4*h*, 204*h*, 304*h*, 404*h*, 504*h* are each formed of a flexible sheet or other suitable material, the structure is simplified.

(3) Since a pair of support members 4*u*, 404*u* are disposed, or since four (two sets of) support members 204*u*, 504*u* are disposed in substantially opposing relation with the neutral position of the movable member or the control member therebetween, optical performance or a touch and feel in the operation is very hardly deteriorated due to, e.g., tilting of the movable member or the control member in the direction perpendicular to the plane in which the optical axis or the like is movable, and a play involved in the direction perpendicular to the plane in which the optical axis or the like is movable. Further, since the movable member unit 2*u*, 202*u* or the control member 402, 502 is supported in a more balanced manner, it is possible to more positively restrain rotation of the movable member unit 2*u*, 202*u* about the optical axis, or rotation of the control member 402, 502 about the axis perpendicular to the plane in which it is movable for operation.

(4) By forming the elongated holes 204*f* in the hinge portion 204*h*, 504*h* to extend in the direction of the optical axis or in the direction perpendicular to the plane in which the control member is movable for operation, and adjusting the length of the elongated holes 204*f*, resistance against deformation of the hinge portion 204*h*, 504*h* of the support member 204*u*, 504*u* can be set to any desired small value. As a result, it is possible to reduce the shift driving force required for electromagnetically driving the movable member, or the operating force required for moving the control member.

As described above, according to the embodiments of the present invention, there is provided a support device with which movable means movable in a plane can be supported with a small-sized and simple structure in such a manner as to be able to freely move in the plane with the smallest possible resistance in driving the movable means, and the movable means can reliably and accurately maintain a proper posture without including any play in a direction perpendicular to that plane.

Also, according to the embodiments of the present invention, there is provided a support device which includes a pair of support means or two sets of paired support means to more positively restrain the movable means from moving in a direction perpendicular to the plane in which the movable means is allowed to shift, whereby tilting of the movable means and a play in the same direction are very hardly ever caused, and which can support the movable means in a more balanced manner, whereby the movable means is more positively restrained from moving and hence can be more reliably and accurately held in a proper posture.

Further, according to the embodiments of the present invention, there is provided a support device which can reduce resistance against deformation of the hinge portion of the support means, and can diminish driving force required for moving the movable means.

According to the embodiments of the present invention, there is provided an input device with which movable means movable in a plane, such as a control member, can be supported with a small-sized and simple structure in such a manner as to be able to freely move in the plane with the smallest possible resistance in operating the control member, and a good touch and feel can be obtained in the operation.

Also, according to the embodiments of the present invention, there is provided an input device which includes a pair of support means or two sets of paired support means to more positively restrain the movable means from moving in the direction perpendicular to the plane in which the movable means is operated, whereby tilting of the movable means and a play in the same direction are very hardly ever caused, and which can support the movable means in a more balanced manner, whereby the movable means is more positively restrained from rotating about the axis perpendicular to the plane in which the movable means is operated, and hence a good feeling can be obtained in the operation.

Further, according to the embodiments of the present invention, there is provided an input device which can reduce resistance against deformation of the hinge portion of the support means, and can diminish operating force required for moving the movable means, thus enabling the operator to smoothly operate the movable means with a good touch and feel.

According to the embodiments of the present invention, there is provided a lens shifting device with which a compensating lens can be supported with a small-sized and simple structure in such a manner as to be able to freely move in a plane perpendicular to the optical axis with the smallest possible resistance in driving the compensating lens for shifting, and shift position control can be achieved with high accuracy while reliably and accurately holding the compensating lens perpendicular to the optical axis without causing any play in the direction of the optical axis.

Also, according to the embodiments of the present invention, there is provided a lens shifting device which includes a pair of lens support members arranged in substantially opposing relation to more positively restrain the compensating lens from moving in the direction of the optical axis, whereby optical performance is very hardly ever deteriorated due to tilting of the compensating lens and a play in the direction of the optical axis, and which can support the movable member in a more balanced manner, whereby the movable member is more positively restrained from rotating about the optical axis and hence shift position control for the compensating lens can be achieved with high accuracy.

Further, according to the embodiments of the present invention, there is provided a lens shifting device which can reduce resistance against deformation of the lens support member, and can diminish driving force required for electromagnetically shifting the movable member.

As for the above and other features, while the present invention has been described with respect to what is presently considered to be the preferred embodiments, it is to be understood that the present invention is not limited to the disclosed embodiments. To the contrary, the invention is intended to cover various modifications and equivalent arrangements included within the spirit and scope of the appended claims. The scope of the following claims is to be accorded the broadest interpretations so as to encompass all such modifications and equivalent structures and functions.

Also, the individual components shown in schematic or block form in the drawings are all well-known in the camera arts and their specific construction and operation are not critical to the operation or best mode for carrying out the invention.

Further, the present invention may be implemented by, as needed, combining the above-described embodiments or technical elements used in the embodiments with each other.

Moreover, the present invention may be implemented such that the whole or part of any of the appended claims or the above-described embodiments constitutes one device, or is combined with another device, or serves as one or more components of a device.

Additionally, the present invention is applicable to any of various forms of cameras, such as a single-lens reflex camera, a lens shutter camera and a video camera, optical equipment, etc., other than cameras, devices for use in cameras, optical equipment, etc., or components thereof.

What is claimed is:

1. A light flux deflecting device comprising:
   a light flux deflector displaceable in a predetermined plane to deflect a light flux; and
   support means for supporting said light flux deflector in such a manner as to allow said light flux deflector to move in a direction along said predetermined plane, but to restrain said light flux deflector from moving in a direction perpendicular to the predetermined plane, said support means including a support portion comprising (1) at least three hinge portions that are arranged to extend in a direction along the predetermined plane, and (2) rigid members each positioned between two adjacent hinge portions and having a predetermined width in a direction along the predetermined plane.

2. The light flux deflecting device according to claim 1, wherein said support portion includes a flexible member that forms each of said at least three hinge portions.

3. The light flux deflecting device according to claim 2, wherein said flexible member includes means for integrally arranging said flexible member with said rigid members.

4. The light flux deflecting device according to claim 2, wherein said flexible member includes respective holes provided in portions thereof forming said at least three hinge portions.

5. The light flux deflecting device according to claim 4, wherein each of said respective holes is elongated and extends in the direction perpendicular to the predetermined plane.

6. The light flux deflecting device according to claim 2, wherein respective portions of said flexible member forming said at least three hinge portions have an elongated shape extending in the direction perpendicular to the predetermined plane.

7. The light flux deflecting device according to claim 2, wherein each of said rigid members has a width in the direction along the predetermined plane that is larger than the width of a portion of said flexible member forming a hinge portion in the direction along the predetermined plane.

8. The light flux deflecting device according to claim 1, wherein said support means includes a plurality of support members, each support member including a respective support portion.

9. The light flux deflecting device according to claim 8, wherein said support means includes at least one pair of opposing support members, each support member including a respective support portion.

10. The light flux deflecting device according to claim 8, wherein said support means includes two pairs of opposing support members, each support member including a respective support portion.

11. The light flux deflecting device according to claim 8, wherein one of said plurality of support members is connected to a predetermined portion of said light flux deflector, and another one of said plurality of support members is connected to another portion of said light flux deflector different from said predetermined portion.

12. The light flux deflecting device according to claim 1, wherein said light flux deflector includes an optical member.

13. The light flux deflecting device according to claim 1, wherein said light flux deflector includes means for moving the light flux along a plane substantially perpendicular to an optical axis of the deflected light flux.

14. The light flux deflecting device according to claim 1, wherein said light flux deflector includes means for compensating for image deviation by deflecting the light flux along a plane substantially perpendicular to an optical axis of the deflected light flux.

15. The light flux deflecting device according to claim 1, wherein each of said rigid members has bevelled edge portions adjacent respective hinge portions of said support portion.

16. A movable device comprising:
   a movable member displaceable in a predetermined plane; and
   support means for supporting said movable member in such a manner as to allow said movable member to move in a direction along the predetermined plane, but to restrain said movable member from moving in a direction perpendicular to the predetermined plane, said support means including a support portion comprising (1) at least three hinge portions that are arranged to extend in a direction along the predetermined plane, and (2) rigid members each positioned between two adjacent hinge portions and having a predetermined width in a direction along the predetermined plane.

17. The movable device according to claim 16, wherein said movable member includes an externally-operated movable control portion.

18. The movable device according to claim 16, wherein said support portion includes a flexible member that forms each of said at least three hinge portions.

19. The movable device according to claim 18, wherein said flexible member includes means for integrally arranging said flexible member with said rigid members.

20. The movable device according to claim 18, wherein said flexible member includes respective holes provided in portions thereof forming said at least three hinge portions.

21. The movable device according to claim 20, wherein each of said respective holes is elongated and extends in the direction perpendicular to the predetermined plane.

22. The movable device according to claim 18, wherein respective portions of said flexible member forming said at least three hinge portions have an elongated shape extending in the direction perpendicular to the predetermined plane.

23. The movable device according to claim 18, wherein each of said rigid members has a width in the direction along the predetermined plane that is larger than the width of a portion of said flexible member forming a hinge portion in the direction along the predetermined plane.

24. The movable device according to claim 16, wherein said support means includes a plurality of support members, each support member including a respective support portion.

25. The movable device according to claim 24, wherein said support means includes at least one pair of opposing support members, each support member including a respective support portion.

26. The movable device according to claim 24, wherein said support means includes two pairs of opposing support members, each support member including a respective support portion.

27. The movable device according to claim 24, wherein one of said plurality of support members is connected to a predetermined portion of said movable member, and another one of said plurality of support members is connected to a portion of said movable member different from said predetermined portion.

28. The movable member according to claim 16, wherein each of said rigid members has bevelled edge portions adjacent respective hinge portions of said support portion.

* * * * *

UNITED STATES PATENT AND TRADEMARK OFFICE
CERTIFICATE OF CORRECTION

PATENT NO.    : 6,288,854 B1
DATED         : September 11, 2001
INVENTOR(S)   : Yasuhiro Toyoda It is certified that error appears in the above-identified patent and that said Letters Patent is hereby corrected as shown below:

Title page,
Item [57], ABSTRACT,
Line 2, "displacable" should read -- displaceable --.
Line 20, "displacable" should read -- displaceable --.

Column 1,
Line 59, "parallel4-articulation" should read -- parallel 4-articulation --; and
Line 66, "parallel4-articulation" should read -- parallel 4-articulation --.

Column 3,
Line 21, "of 4" should read -- of the parallel 4- --.

Column 4,
Line 1, "cable" should read -- ceable --;
Line 13, "displacable" should read -- displaceable --;
Line 21, "displacable" should read -- displaceable --;
Line 35, "displacable: should read -- displaceable --; and
Line 42, "curser" should read -- cursor --.

Column 7,
Line 57, "110y" should read -- 101y --.

Column 9,
Line 8, "a3-articulation" should read -- a 3-articulation --;
Line 24, "a3-articulation" should read -- a 3-articulation --; and
Line 52, "a3-articulation" should read -- a 3-articulation --.

Column 10,
Line 44, "a3-articulation" should read -- a 3-articulation --; and
Line 66, "a3-articulation" should read -- a 3-articulation --.

Column 11,
Line 49, "a3-articulation" should read -- a 3-articulation --.

Column 12,
Line 43, "a3-articulation" should read -- a 3-articulation --.

UNITED STATES PATENT AND TRADEMARK OFFICE
CERTIFICATE OF CORRECTION

PATENT NO. : 6,288,854 B1
DATED : September 11, 2001
INVENTOR(S) : Yasuhiro Toyoda It is certified that error appears in the above-identified patent and that said Letters Patent is hereby corrected as shown below:

Column 13,
Line 2, "a3-articulation" should read -- a 3-articulation --; and
Line 63, "a3-articulation" should read -- a 3-articulation --.

Column 14,
Line 32, "a3-articulation" should read -- a 3-articulation --; and
Line 60, "a3-articulation" should read -- a 3-articulation --.

Column 15,
Line 8, "a3-articulation" should read -- a 3-articulation --.

Column 16,
Line 11, "a3-articulation" should read -- a 3-articulation --;
Line 26, "a3-articulation" should read -- a 3-articulation --; and
Line 51, "a3-articulation" should read -- a 3-articulation --.

Column 17,
Line 3, "a3-articulation" should read -- a 3-articulation --.

Signed and Sealed this

Seventh Day of May, 2002

*Attest:*

*Attesting Officer*

JAMES E. ROGAN
*Director of the United States Patent and Trademark Office*